United States Patent
Georgoff et al.

(10) Patent No.: US 10,387,903 B2
(45) Date of Patent: Aug. 20, 2019

(54) PROVIDING SINGLE-USE OFFERS

(71) Applicant: RetailMeNot, Inc., Austin, TX (US)

(72) Inventors: Michael Thomas Georgoff, Austin, TX (US); Scott Jason Throndson, Austin, TX (US); Jeffrey Ryan Rego, Austin, TX (US)

(73) Assignee: RetailMeNot, Inc., Austin, TX (US)

( * ) Notice: Subject to any disclaimer, the term of this patent is extended or adjusted under 35 U.S.C. 154(b) by 1144 days.

(21) Appl. No.: 14/531,147

(22) Filed: Nov. 3, 2014

(65) Prior Publication Data

US 2015/0134431 A1   May 14, 2015

Related U.S. Application Data

(60) Provisional application No. 61/902,139, filed on Nov. 8, 2013.

(51) Int. Cl.
*G06Q 30/00* (2012.01)
*G06Q 30/02* (2012.01)

(52) U.S. Cl.
CPC ..... *G06Q 30/0211* (2013.01); *G06Q 30/0207* (2013.01)

(58) Field of Classification Search
None
See application file for complete search history.

(56) References Cited

U.S. PATENT DOCUMENTS

| | | | |
|---|---|---|---|
| 2003/0004802 A1 | 1/2003 | Callegar | |
| 2005/0192834 A1* | 9/2005 | Yates, Jr. | G06Q 20/10 705/39 |
| 2011/0178867 A1* | 7/2011 | King | G06Q 30/02 705/14.44 |
| 2012/0066047 A1* | 3/2012 | Muthugopalakrishnan | G06Q 20/387 705/14.26 |
| 2013/0117083 A1* | 5/2013 | Gossett | G06Q 30/02 705/14.13 |

(Continued)

FOREIGN PATENT DOCUMENTS

| KR | 1020110023716 A | 3/2011 |
|---|---|---|
| KR | 1020110098118 A | 9/2011 |
| KR | 1020130100858 A | 9/2012 |

OTHER PUBLICATIONS

International Preliminary Report on Patentability for Related PCT Application PCT/US2014/064551, dated May 10, 2016, pp. 1-9.

(Continued)

*Primary Examiner* — Meredith A Long
(74) *Attorney, Agent, or Firm* — Pillsbury Winthrop Shaw Pittman LLP

(57) ABSTRACT

Provided is a process, including: obtaining an offer issued by a merchant, the offer being redeemable on-line, at the merchant's website, in-store, at a physical location of the merchant, or both; obtaining a plurality of single-use offer codes associated with the offer; receiving a request for a single-use offer code, the request having a phone number; sending to the phone number, via a text messaging service, a text message comprising a uniform resource identifier (URI) to a select single-use offer code of the plurality single-use offer codes; and sending the single-use offer code to a consumer user device in response to a user selection of the URI.

17 Claims, 20 Drawing Sheets

(56) References Cited

U.S. PATENT DOCUMENTS

2013/0159086 A1 6/2013 Richard
2014/0012686 A1* 1/2014 Arbon ................ G06Q 30/0277
705/14.73

OTHER PUBLICATIONS

International Search Report and Written Opinion for Related PCT Application PCT/US2014/064551, dated Feb. 17, 2015, pp. 1-12.

* cited by examiner

FIG. 9

PROVIDING SINGLE-USE OFFERS

CROSS-REFERENCE TO RELATED APPLICATIONS

The present application claims the benefit of U.S. Provisional Patent Application 61/902,139, filed 8 Nov. 2013, and having the same title as this filing. Each parent application is hereby incorporated by reference in its entirety for all purposes.

BACKGROUND

1. Field

The present invention relates generally to offers and, more specifically, to systems for electronically tracking offers having offer location data.

2. Description of the Related Art

Often merchants enlist third parties to promote offers, such as coupons, sales, rebates, favorable shipping terms, or other changes in terms favorable to consumers. This practice in recent years has expanded greatly in the context of the Internet. In some cases, a given offer may be distributed by thousands of publishers on the World Wide Web (or other content-publishing platforms, such as those having native applications on mobile devices) to millions of consumers. Each publisher may draw an audience based on content gathered, curated, or created by that publisher, and merchants may compensate a publisher for presenting the merchant's offers to that publisher's audience. Consequently, consumers become aware of potentially valuable offers; merchants benefit from wide distribution of their offers; and publishers are compensated for providing content valued by their audience.

Generally, merchants seek wide distribution of their offers to large numbers of publishers and consumers, in some cases according to geographic or publisher-type constraints consistent with a merchant's brand and geographic reach. But managing a large network of publishers is difficult and expensive. For instance, simply determining compensation can be challenging at large scales. Often, publishers are compensated based on revenue that is received by the merchant from visitors to the publishers website or other application, and keeping track of which publishers should be credited for which transactions can be very expensive, particularly when a merchant wishes to work with thousands of publishers potentially leading to millions of transactions. Further, selecting, communicating with, and establishing contractual relationships with thousands of publishers can be expensive, complex, and labor intensive.

Similarly, many publishers wish to work with a relatively large number of merchants in order to receive a relatively large number of offers to present to the publishers' audiences. Yet many publishers lack the resources to track, across hundreds of merchants, which offers led to compensable consumer actions or establish contractual relationships with hundreds of merchants, let alone accommodate a potentially diverse set of merchant-specific protocols and business processes for communicating information about offers.

To shield both merchants and publishers from this complexity, many on-line offers are distributed through affiliate-network systems. These computer systems act as an intermediary between publishers and merchants, distributing offers to publishers, allocating credit to publishers for revenue they generate for merchants, simplifying the process of establishing contractual relationships, and standardizing communication protocols and business processes. (Though not all affiliate-network systems necessarily fill all of these roles.) Often merchants and publishers access these computer systems through role-specific interfaces presented over the Internet, or access may be provided via a human representative of the entity operating the affiliate-network system who updates the system on behalf of merchants or publishers.

Many affiliate-network systems are ill-suited to address future trends in the distribution of offers expected by applicants. As smart phones and other mobile user devices proliferate, it is becoming increasingly viable and desirable to present and redeem offers both on-line, when the consumer is away from (or not necessarily at) the geographic location of a merchant's brick-and-mortar store, and in-store, when the consumer is physically present at a merchant's location. Further, as consumers integrate more networked devices and network-accessible accounts into their lives, many consumers wish to distribute offer discovery, offer curation, and offer redemption across multiple electronic devices and accounts, with activities through one device or account being reflected in other devices or accounts. Yet many traditional affiliate-network systems are not configured to track these activities both on-line and off-line (e.g., in-store or through a different device or account from that through which the publisher initially presented the offer). As a consequence, these traditional systems are ill-suited to properly compensate publishers, distribute offers through multiple on-line and off-line channels, or provide merchants and publishers with analytics and controls spanning multiple channels.

SUMMARY

The following is a non-exhaustive listing of some aspects of the present techniques. These and other aspects are described in the following disclosure.

Some aspects include a process, including: obtaining an offer issued by a merchant, the offer being redeemable both on-line, at the merchant's website, in-store, at a physical location of the merchant, or a combination thereof and obtaining a plurality of single-use offer codes associated with the offer, each of the plurality of single-use offer codes being redeemable for a single transaction. The process further includes receiving, via a network, a request for a single-use offer code, the request comprising a phone number and sending to the phone number, via a text messaging service, a text message comprising a uniform resource identifier (URI) to a select single-use offer code of the plurality single-use offer codes. Additionally, the process includes sending the select single-use offer code to a consumer user device in response to a user selection of the URI on the consumer user device.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following FIGS. in which like numbers indicate similar or identical elements:

FIG. 9 shows an example of a merchant-analytics interface that presents data aggregated across multiple channels of offer interaction;

Figure 1:
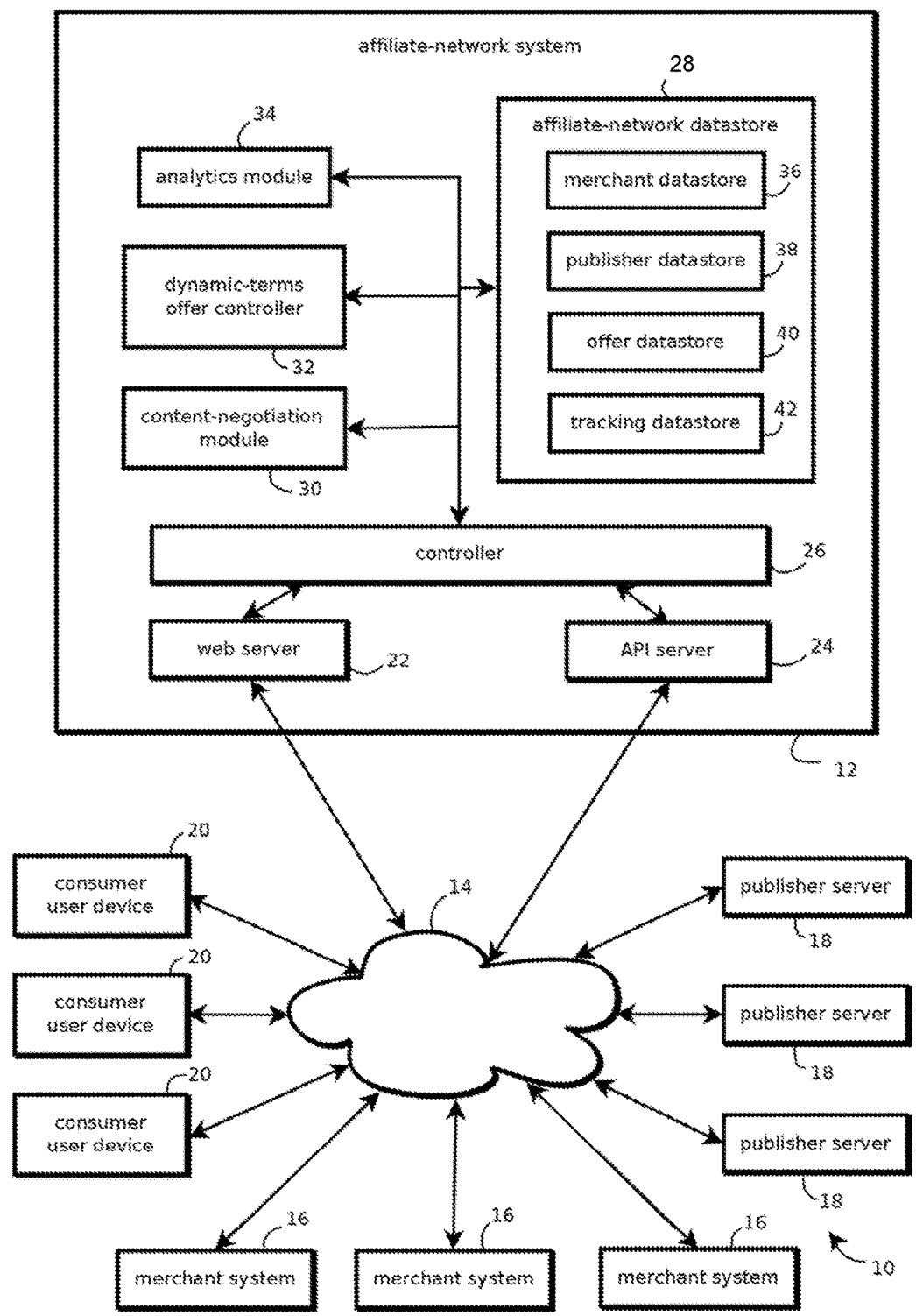
FIG. 1 shows a computing environment having an example of an affiliate-network system in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIG. 1 shows a computing environment 10 having an embodiment of an affiliate-networking system 12. The illustrated system 12, in some implementations, mitigates the above-mentioned problems with traditional affiliate-network systems, problems that, as noted, are particularly acute when existing systems are applied to offers redeemable both in-store and on-line. To mitigate these problems, the applicants had to both invent solutions and, in some cases just as importantly, recognize problems overlooked (or not yet foreseen) by others in the field. Indeed, applicants wish to emphasize the difficulty of recognizing those problems that are nascent and will become much more apparent in the future should trends in the affiliate-networking industry continue as applicants expect. Further, because multiple problems are addressed, it should be understood that some embodiments are problem-specific, and not all embodiments address every problem with traditional systems described herein. That said, solutions to many of these problems are described with reference the affiliate-networking system 12 of FIG. 1.

In some embodiments, the affiliate-network system 12 is configured to distribute and track offers that are (for some offers) each redeemable on-line and off-line, which includes in-store redemption and redemption through other devices or accounts:

a. To accommodate the different display capabilities of various accounts and devices, some embodiments receive, from a merchant, and implement specifications for an offer that define, at least in part, how the offer is to be displayed in each of a variety of different modes of presentation, such as on a desktop computer web browser, on a tablet computer native application, on a smart phone, in print, in email, and in short message service text messages, to name a few examples.

b. To facilitate tracking, some embodiments host offer content that publishers embed in their websites, native applications, or other publisher content. In some cases, the offer content returns to the affiliate-network system user interactions with offers (e.g., selections of buttons and the like) that may be tracked both when the user pursues on-line redemption and off-line redemption.

c. To reduce the complexity of managing multi-channel offers for merchants, publishers, and consumers, some embodiments store data about an offer with reference to a single offer record, such that multiple forms of interaction and presentation are readily tracked, configured, or otherwise managed, with reference to the single record.

d. To reduce complexity for those distributing offers, some embodiments are configured to provide multi-channel access to an offer through a single uniform resource identifier (URI) corresponding to the offer, such that a request for offer content identifying the URI (e.g., when a consumer's web browser encounters the URI embedded in a publisher's website) yields offer content configured according to the type of device or account to which the offer content is directed. Using a single URI for differently formatted presentation of an offer is expected to simplify offer management for both consumers and publishers, as format-specific URI need not be tracked by these parties.

e. To facilitate tracking of multi-channel offers, some embodiments are configured to provide analytics to both merchants and publishers that aggregate both on-line and off-line consumer interactions, such as redemptions.

f. To facilitate control of multi-channel offers, some embodiments execute routines specified by merchants for dynamically adjusting the terms of offers based on feedback from multiple channels of offer redemption, including on-line and in-store redemptions.

Thus, some embodiments of the affiliate-network system 12 address a variety of different problems associated with the use of offers that are redeemable both on-line and in-store. Each of these solutions, however, need not be included in every embodiment, as some embodiments may address only some of the above-described problems with existing affiliate-network systems, which is not to suggest that any other feature described herein may not also be omitted in some embodiments.

Operation of the affiliate-network system 12 is better understood in view of the other components of the computing environment 10 with which the system 12 interacts. As illustrated by FIG. 1, embodiments include the Internet 14, merchant systems 16, publisher servers 18, and consumer user devices 20. The components of the computing environment 12 connect to one another through the Internet 14 and various other networks, in some cases, such as cellular networks, local area networks, wireless area networks, and the like. While three of each component 16, 18, and 20 are illustrated, it should be understood that embodiments with substantially more of these devices are contemplated. For example, likely applications include tens of millions of consumer user devices 20, tens of thousands of publisher servers 18, and hundreds or thousands of merchant systems 16.

The illustrated merchant systems 16 may each correspond to a different merchant and may each include a variety of different types of computing devices used by the respective merchants in the course of business. Merchant systems 16 may include merchant web servers that host merchant websites. In some cases, it is the merchant websites to which consumer user devices 20 are directed for on-line redemption of offers and to view goods or services associated with offers. Merchant systems 16 may also include user devices of merchant employees that interact with the affiliate-network system 12 to configure new offers, reconfigure existing offers, view analytics associated with offers and publishers, and otherwise control offers issued by the respective merchant. Merchant systems 16 may also include point-of-sale terminals and electronic kiosks located at the physical sites of the respective merchant, such as at retail stores or service centers. Systems 16 may also include merchant databases connected to those point-of-sale terminals for storing financial-transaction records associated with transactions with, e.g., sales to, consumers. The merchant systems 16 may be configured to automatically, or at the direction of the merchant's employees, upload transaction records from the merchant's database to the affiliate-network system 12. These uploaded transaction records, in some embodiments, are used to determine compensation for publishers based on in-store redemptions of offers by consumers, the compensation rewarding publishers who potentially made the consumers aware of the offers as indicated by records in the affiliate-network system 12. Often, merchant systems 16 are geographically distributed, for example, having point-of-sale terminals in multiple stores of a retail chain, and having a merchant database and employee user devices in a central office of the respective merchant.

The publisher servers 18, in some embodiments, serve publisher content (e.g., web pages, data for display with a native application on a mobile device, set-top box, in-store kiosk, or the like). In some cases, the publisher content is served to consumer user devices 20 and includes instructions to retrieve and display offer content from the affiliate-network system 12. In some cases, the offer content is embedded in the publisher's content, e.g., with URI's in a publisher's webpage that cause a web browser to retrieve and embed content from the affiliate-network system 12 bracketed with an HTML "embed" tag, an i-frame, or other instructions that cause content from outside the publisher's domain to be displayed. In some cases, the offer content is not embedded and is referenced by linking or re-directing to the affiliate-network system 12. Or, in some cases, the publisher servers 18 serve offer content directly to consumer user devices 20.

The publisher content, in some cases, is web content, like websites having webpages in which multiple offers are referenced or included. In some cases, consumers seek out the websites of publishers because the publishers curate offers on behalf of the consumers (e.g., selecting offers based on quality, success rate, subject matter, or the like). Publisher servers 18 may provide, in the publisher content, interfaces by which consumers can share data indicative of the efficacy or applicability of offers, for example, by indicating success rates for offers, providing content or comments about offers, rating offers, categorizing offers, or up-voting or down-voting offers. In other cases, the publishers servers 18 host content that is not specific to offers, such as webpages about particular areas of interest, like sporting goods, electronic devices, home goods, fashion, current events, or the like, and the publishers includes links to offers curated with that publisher's audience in mind.

In other cases, the publisher servers 18 host a publisher application program interface (API) that services native applications on consumer user devices 20 (which may include public devices, like kiosks). For example, some publishers may offer a (non-web-browser) native application on a smart phone or tablet that is down-loadable from a user-device maker's service for providing approved applications. Examples of such applications include barcode-scanning applications by which a user captures an image of a product barcode with a camera of the consumer user device 20, and the application converts the image into a product stock-keeping unit (SKU), which is then submitted to the publisher server 18 for retrieving offers related to the SKU to be displayed on the consumer user device 20.

In another example, the application includes an application specifically for viewing offers. In some cases, the native application may be configured to interact with a user account hosted by the publisher server 18 (which may include a plurality of computing devices, such as a user profile database and offers database) by which the user can view offers that they previously designated as favorites or view offers that friends of the offer user (e.g., as registered in a social network to which the server has access) have identified to the offer user. Such native applications for viewing offers may further include various tools by which the user can readily view and navigate through a plurality of offers, for example, including searching tools, faceted search, and lists of curated offers. In some cases, the native application is configured to obtain a geographic location of the user device, for example, with a GPS sensor or other location determining service accessed by the operating system of the consumer user device, and request offers based on the geographic location from the publisher server 18, such as in-store offers for merchant stores that are near (e.g., within a threshold distance to or ranked based on a location of) the consumer user device. In some cases, the offers satisfy various other criteria, for example, corresponding to a user profile indicating the types of offers in which the user is likely to be interested. In other cases, a native application on the consumer user device may serve any of a variety of other functions for the consumer, and that native application presents offers as advertisements to subsidize the cost of providing that service.

The consumer user devices 20 may be any of a variety of different types of computing devices through which consumers access the Internet 14. Examples of such computing devices are described below with reference to FIG. 17. In some cases, a given consumer user device 20 is a smart phone, tablet computer, laptop computer, or desktop computer. Consumer user devices 20 include a processor and memory and may execute an operating system in which a web browser or native application executes for viewing offers. In some cases, the consumer user device 20 is a mobile user device, which includes a portable power supply, like a battery, a fuel cell, or a solar energy source, such that the consumer can carry the user device into a merchant's physical store for in-store redemption. In some cases, such mobile user devices include a wireless interface, such as Bluetooth™, a near-field communication (NFC) interface, or a wireless area network interface, by which the consumer user device exchanges information with the point-of-sale terminal about offers being redeemed, such as an offer identifier. Further, in some cases, the mobile user device includes a display by which an identifier of the offer to be redeemed is presented and is entered into a point-of-sale terminal, for instance, by a sales clerk viewing the display and manually typing in the offer identifier (e.g., an offer code), or by the sales clerk scanning the display with a barcode scanner or an optical scanner. In other cases, the consumer user device is not mobile and includes a relatively large display, for example, a desktop computer or a set-top box connected to a television with a screen larger than 10-inches measured diagonally. In some cases, consumer user devices 20 include an application specifically for viewing offers (e.g., a native application executing on a set-top box, like a gaming console or streaming media device) or include a web browser by which the user navigates to a publisher's website for viewing offers and to a merchant's website for redeeming offers. Consumer user devices 20 may be any of a variety of types of electronic devices connected to the Internet 14 by which users are made aware of, store, or obtain information about offers, including smart watches, head-mounted displays, networked appliances (e.g., Internet-enabled refrigerators), or public computing devices, such as an in-store kiosk.

As noted above, in some cases, offer content viewed on consumer user devices 20 is identified to consumers by publisher servers 18, but is hosted by the affiliate-network system 12. For example, publisher servers 18 may send consumer user devices 20 a webpage listing a plurality of offers, and each offer listing may include an instruction to the consumer user device 20 to retrieve offer content from the affiliate-network system 12 corresponding to the offer, for example, a URI of the respective offer that directs the consumer user device 20 to retrieve content from the affiliate-network system 12. Offer content may include various offer resources by which views of offers are constructed, such as mark-up information, templates, images, offer terms, coupon codes, and interfaces for interacting with the offer (e.g., buttons and scripts executed when buttons are selected to effectuate selected actions). The offer content may be hosted by the affiliate-network system 12, rather than the publisher server 18, to facilitate tracking of offer interactions (e.g., redemptions, sharing, printing, or sending to another device or account) across both on-line and off-line redemption channels. Or, some embodiments host the offer content on the publisher servers 18 instead of, or in addition to, the affiliate-network system 12.

Thus, in some cases, the display of an offer on a consumer user device 20 may be preceded by the consumer user device 20 requesting content from the publisher server 18, receiving that content, determining that the content includes instructions to request offer content from the affiliate-network system 12 on a different domain from the publisher server 18, and executing those instructions, to retrieve the offer content. In some cases, the instructions from the publisher server 18 to request offer content do not specify the type of user device or type of account in which the offer will be viewed. Rather, in some embodiments, a single instruction, such as a single URI per offer, is provided by the publisher server 18 regardless of the type of consumer user device or the account, thereby relieving publishers of the burden of maintaining multiple, different instructions for a single offer for each of the various potential viewing options. In response, the consumer user device 20 may request content according to this instruction, for example with the URI. In response, the affiliate-network system 12 may determine based on the request and, in some cases, additional information about the consumer user device 20 or account, the appropriate offer content for the type of presentation in which the offer will be viewed or otherwise used.

In some embodiments, the affiliate-network system 12 includes a web server 22, an API server 24, a controller 26, an affiliate-network data store 28, a content-negotiation module 30, a dynamic-terms offer controller 32, and an analytics module 34. These components are illustrated and described as discrete functional blocks, but it should be understood that code or hardware by which this functionality is provided may be subdivided, intermingled, conjoined, or otherwise differently arranged. Further, it should be understood that one or more computing devices, and in many embodiments, a plurality of computing devices, by which this functionality is implemented may be geographically distributed or co-located, for example, in a data processing facility. Further, it should be understood that some of the components and features of the affiliate-network system 12 may be omitted in some embodiments, which is not to suggest that any other feature is required in all embodiments.

In some embodiments, the web server 22 is operative to receive requests from web browsers executed by user devices of consumers, publishers, or merchants. In some cases, those requests include requests for, or interactions with, role-specific webpages, for consumers, publishers, or merchants. For instance, a merchant may request a webpage for specifying a new offer, viewing data about a previously specified offer, or adjusting attributes of an existing offer. In another example, the web server 22 may include code for providing a webpage with interfaces by which merchants create a new merchant account, view data about a merchant account, or adjust attributes of a merchant account. Similarly, the web server 22 may include code for providing a webpage with interfaces for specifying a publisher account, viewing a publisher account, or adjusting a publisher account. In some cases, these interfaces include buttons that when selected cause client-side scripts to communicate with web-server 22. Other example interfaces include text boxes, radio buttons, check boxes, and the like for data entry. Browsers executing on user devices may submit entered data and commands to the web server 22, which may advance the commands to the controller 26 for responsive action by the affiliate-network system 12. Similarly, the web server 22 may receive requests for resources from such user devices, for example, to form the corresponding webpages, and the web server 22 may advance requests for responsive content to the controller 26 for retrieving and returning the responsive content.

The API server 24, in some cases, may be configured to support programmatic interaction with the affiliate-network system 12 through programs (e.g., non-web-browser programs) executing on the publisher servers 18, the merchant system 16, or consumer user devices 20. The API server 24 may support a variety of commands to manipulate or retrieve data from the affiliate-network data store 28, examples of which are described throughout this document. In some cases, the API server 24 may be operative to receive a request for offers from a publisher server 18 and advance that request to the controller 26 which retrieves responsive offers from the affiliate-network data store 28. The API server 24 may return those offers to the publisher's server 18 from which the request was received. In some cases, the request specifies various criteria of the offers, such as geographic criteria, a category of offers, a type of redemption, a merchant, a category of merchant, or other offer attributes, and the API server 24 instructs the controller 26 to retrieve responsive offers satisfying the criteria. Similar requests may be received from the merchant system 16 or the user devices 20, depending upon the application. In some cases, the API server 24 is operative to receive and initiate responses to publisher or merchant requests for role-specific analytics, such as data for reports provided by the analytics module 34 described below. Other interfaces supported by the API server 24 may include, in some embodiments, upload functionality, by which merchants upload new offers programmatically, change offers programmatically, or upload transaction data describing in-store redemptions of offers. Similarly, in some cases, publishers may upload information about user interactions with the offers programmatically, or consumer user devices 20 may upload information about consumers or consumer interactions with offers programmatically, provided that the consumer has opted in to the appropriate privacy settings allowing such uploads.

In some embodiments, the controller 26 is operative to receive commands and data from the web server 22 or the API server 24 and coordinate responsive actions by the other components of the affiliate-network system 12. Examples of activities coordinated by the controller 26 are described below with reference to FIGS. 2 through 6. In some cases, the controller 26 is operative to translate web requests or API requests into corresponding data transformations and database interactions to store or retrieve implicated data.

In some embodiments, the affiliate-network data store 28 stores data about merchants, publishers, offers, and consumer interactions with offers. The affiliate-network data store 28, in some cases, is a relational database, or other types of data stores may be used, including hierarchical key-value stores, program state, and memory images. In this embodiment, the affiliate-network data store 28 includes a merchant data store 36, a publisher data store 38, an offer data store 40, and a tracking data store 42. In some cases, each of these data stores 36, 38, 40, and 42 may be separate databases or, in other cases, these data stores may be intermingled in a single database or other data store. The affiliate-network data store 28 may be operative to persistently store data about merchants, publishers, offers, and consumer interactions with those offers. In some cases, the affiliate-network data store 28 is configured to receive queries, for example, submitted in the form of structured query language from controller 26 and respond with responsive data. Similarly, the affiliate-network data store 28 may be responsive to commands from controller 26 to store data or delete data, e.g., when creating new records or changing records.

In some embodiments, the merchant data store 36 is configured to store data about merchants that use the affiliate-network system 12 to distribute offers and track interactions with those offers. In some implementations, the merchant data store 36 stores a plurality of merchant records, each merchant record corresponding to a different merchant account with the affiliate-networking system, and in some cases, corresponding to a different merchant. In some cases, each merchant record includes the following data: a trade name of the merchant; a business-entity name of the merchant; a unique merchant identifier by which the merchant record may be linked to other records in the affiliate-network data store 28; merchant-specific branding content (such as images of the merchant's logo at various resolutions, merchant tag-lines, merchant website URLs, or URIs of such content) for use in the merchant's offer content; analytics tags (examples of analytics tags include code or resources, like a tracking pixel, to be added to offer content, like an offer page, corresponding to the respective merchant's analytics system (e.g., Omniture provided by Adobe Systems, Inc. of San Jose, Calif., or Google Analytics provided by Google Inc. of Mountain View Calif., among others) that cause the user device to provide information with the merchant's analytics system, thereby allowing the merchant to measure performance of the offer content as if it was part of their own website or mobile application); geographic merchant locations (e.g., a plurality of site records, each site record corresponding to a brick-and-mortar site and having a location—like a street addresses of the store, latitude and longitude coordinates of the store, or coordinates of a polygon bounding the store—along with store hours, point-of-sale capabilities—like barcode scanning, optical scanning, and NFC capabilities that may be used to exchange data with consumer user devices during an in-store coupon redemption—and various merchant-defined categories) for selecting offers based on location or store-specific attributes; merchant categories (e.g., sporting goods, financial services, retail clothing, and the like) for selecting offers based on merchant specialty; supported coupon code formats (e.g., whether the merchant supports single-use coupon codes that are unique to a customer or customer session with a publisher or other coupon provider, or whether the merchant supports multi-use coupon codes that are widely distributed to multiple users) for determining offer configuration options for a merchant; merchant contact information (e.g., a plurality of employee records, each record having a name, password, role, phone number, email address, and permissions to interact with the affiliate-network system 12 on behalf of the merchant) to facilitate controlled distribution of offers by authorized employees of the merchant; and pre-approved publishers (e.g., publisher identifiers corresponding to records in the publisher data store 38 that have been whitelisted or blacklisted by the merchant, or a category of publishers that have been whitelisted or blacklisted) to facilitate efforts by merchants to limit distribution of their offers to publishers that are consistent with the merchant's brand.

In some embodiments, the publisher data store 38 is configured to store data about publishers that interact with the affiliate-network system 12 to distribute offers. The publisher data store 38 may include a plurality of publisher records, each publisher record corresponding to one publisher account, and in some cases, a different publisher. Each publisher record may include the following data: a publisher trade name; a publisher business-entity name; a publisher identifier that is unique to the publisher record in the affiliate-network system 12 and is used to link the publisher record to other records within the affiliate-network data store 28; a publisher category (e.g., nominal values in a taxonomy of publishers, such as those identifying sports or fashion-related publications); publisher-specific content and resources (e.g., images of the logo of the publisher at various resolutions, publisher-selected settings to configure the visual presentation of offers distributed by that publisher—such as settings defining a publisher's color scheme and indicating which colors are mapped to which offer presentation elements, like buttons, headers, and the like, a publisher's font selection, and various cascading style sheet settings defined by the publisher—as well as a publisher's contact information for consumers—like a web address of a help webpage or FAQ webpage hosted by the publisher, and various other links to other portions of the publishers website, such as a homepage of the publisher, or URIs of such publisher content or resources) to configure offer presentation from the affiliate-network system 12 in a manner that is consistent with the publisher's brand; publisher analytics tags (e.g., like those described above with respect to merchants except tied to a publisher's analytics system); publisher metrics (e.g., audience size as measured by page views, unique page views, number of publisher mobile device application installs, or audience demographics, including geographic distribution of the audience, income of the audience, education level of the audience, interests of the audience, occupations of the audience, and various other statistics characterizing the publisher's audience) to facilitate selection of publishers by merchants according to the publishers audience; distribution channels of the publisher (e.g., publisher websites, mobile device native applications, set-top box applications, and various other programs for displaying and interacting with publisher content on consumer user devices) to facilitate selections of publishers by distribution channel or selections of distribution channels by merchants; publisher geolocation capabilities (e.g., values indicating whether the publisher is capable of obtaining a user geolocation from a location sensor on a mobile phone, Internet Protocol address geolocation, or a user profile maintained with the publisher) to facilitate selection of publishers by merchants according to the expected reliability and existence of geolocation information; other consumer user device interfaces to which the publisher has access (e.g., values indicating whether the publisher operates a native application configured to access a camera of the consumer user device, a microphone of the consumer user device, a near-field communication interface of the consumer user device, a Bluetooth™ user interface of the consumer user device, or other such wireless interfaces) to facilitate selection of publishers by merchants according to these capabilities; and publisher contact information (e.g. a plurality of employee records, each having a name, password, role, phone number, email address, permissions to interact with the affiliate-network system 12, and the like of various employees of the publisher).

In some embodiments, the offer data store 40 is configured to store data about offers issued by merchants for distribution by publishers. The offer data store 40 may store a plurality of offer records, each offer record corresponding to a different offer by a merchant. In some embodiments, each offer record includes the following data: an offer identifier unique within the affiliate-network system 12 and used to link the offer record to other records in the affiliate-network data store 28; a merchant identifier indicating the merchant issuing the offer and linking to one of the merchant records in the merchant data store 36; an offer title to be included as part of offer content displayed on consumer user devices when displaying the offer; a start date of the offer indicating the date or time upon which the offer becomes valid for redemption; an expiration date indicating the date or time upon which the offer ceases to be valid and can no longer be redeemed; a publication date indicating the date or time upon which the offer is available for publishing by publishers; a publication finish date indicating the date or time upon which the offer will cease to be available for publishing; an offer type (e.g., a nominal value indicating whether the offer is a coupon, a sale, a rebate, an offer for discounted shipping, or the like) to facilitate filtering of offers by offer type by publishers or consumers; an offer tracking type (e.g., a Boolean value indicating whether the offer is being tracked, or a nominal value indicating a type of tracking); an offer monetization type (e.g., a Boolean value indicating whether the offer is being monetized (e.g., whether the merchant is compensating the operator of the affiliate-network system 12 for distributing the offer, such as a flat fee, a percent commission, or a cost-per-click reward); a commission type (e.g., a nominal value indicating whether commissions to publishers are based on a per-interaction rate, a per-redemption rate, a per-impression rate, or the like); a commission rate (e.g., a percentage or dollar amount); an offer description (e.g., a prose description of the offer to be sent to consumer user devices 20 when displaying the offer); offer rules (e.g., a condensed, consumer-friendly prose description of relatively significant terms and conditions, such as those limiting the offer to particular brands or highlighting an expiration date, for use when displaying the offer); offer terms and conditions (e.g., a relatively comprehensive prose description of terms and conditions provided by the merchant and defining the terms of the offer, which may be presented in response to a user selection of an interface in the offer content to request the terms and conditions); a store applicability type of the offer (e.g., a Boolean value indicating whether the offer is applicable across a store with no brand or category restrictions, or a nominal value indicating the absence or presence of various types of such restrictions); a domain, publisher, or publisher category whitelist or blacklist of the offer to facilitate fine-grained publisher-by-publisher distribution of subsets of offers by merchants; offer user-interaction limits (e.g., key-value pairs listing a user interaction type, such as printing, sharing in a social network, sending to a text message, or combinations of such interactions, and a limit on the number of permitted interactions for the offer, such as a limited number of times the offer may be printed, shared, sent to a text message, sent to a card-linked offer account, sent to an email account, saved to a clipboard memory of the consumer user device, or sent to an electronic wallet, or combinations thereof, including the aggregate of all interactions) to facilitate efforts by merchants to control the number of redemptions of offers; an offer redemption type (e.g., a list of nominal values indicating the channels through which the offer is redeemable, such as on mobile devices, by printing, by printing from a mobile device, across all channels, or a listing of particular mobile device applications, accepted card-linked offer account providers, electronic wallet providers, or the like that constitute a whitelist or blacklist of channels through which the offer is redeemable or not redeemable) to facilitate efforts by merchants to establish exclusive relationships with providers of such accounts and favor particular types of redemption channels through which offers are believed by merchants to be more effective; an in-store redemption indicator (e.g., a Boolean value indicating whether the offer is valid for in-store redemption by presentation of, for example, a coupon code or offer barcode, by a consumer to a clerk at a point-of-sale terminal) to again facilitate efforts by merchants to control redemption channels to those believed to be effective for the particular offer; a percentage discount of the offer (e.g., 20% off the base price of some good or service) to facilitate offer curation by publishers and consumers according to the amount of the discount and for display on the consumer user device when displaying the offer; a percentage-up-to value indicating whether some applicable discounts supported by the offer are less than the percentage off value; a minimum purchase value (e.g., a minimum purchase amount in dollars or number of goods or services required to receive the percentage off discount of the offer) for offer filtering and display; a dollar amount off from the offer (e.g., five dollars off the price of some good or service) for offer filtering and display; a dollar-up-to amount indicating whether some applicable discounts from the offer are less than the dollar amount off; a minimum-dollar-purchase amount indicating the amount required to be purchased to activate the offer's dollar amount off discount; a Boolean value indicating whether the offer includes a free gift; a prose description of a free gift item; a free shipping Boolean value indicating whether the offer is associated with free shipping of goods; a free-shipping minimum-purchase amount indicating the minimum amount that the consumer must purchase to receive free shipping; a free-gift minimum purchase indicating the minimum purchase required to receive the free gift; a buy-X-get-Y-free key-value pair indicating how many free items are offered for a number of items purchased (e.g., buy one get one free); a by-X-get-Y-free minimum purchase indicating the minimum amount to be purchased to activate the offer for buy-X-get-Y-free key-value pairs; and a category of the offer (e.g., a single-level taxonomy of offers, or a hierarchical taxonomy of offers, such as retail/sporting goods/golf equipment) to facilitate offer filtering and selection by consumers and publishers.

In some embodiments, the tracking data store 42 is configured to store data about interactions with offers, such interactions including in-store redemptions, on-line redemptions, interactions requesting that offer be sent to another consumer user device, or another consumer account (e.g., a card-linked offer account, an electronic wallet account, an email account, a social networking account, or the like). In some cases, the tracking data store 42 includes a plurality of offer-tracking records, each offer-tracking record corresponding to a different instance of interaction with an offer (e.g., a given consumer, requesting a printable view of a given offer and that consumer presenting the printout at a point-of-sale to redeem the offer would constitute two records). In some embodiments, each offer-tracking record includes the following data: an interaction identifier unique within the affiliate-network system 12 and by which offer interactions are linked with other records within the affiliate-network system 12; an identifier of an offer to which the interaction relates (e.g., an identifier of one of the offer records in the offer data store 40); a publisher identifier indicating the publisher to be credited with the interaction (e.g., an identifier of one of the publisher records in the publisher data store 38 identifying a publisher that distributed the offer to a consumer user device 20 through which the interaction occurred); related interactions (e.g., identifiers of earlier interactions potentially causally related to the interaction record, such as a print interaction that lead to an in-store redemption interaction, or a social-network sharing interaction that lead to an on-line redemption interaction by the recipient); a consumer user device identifier that identifies the consumer user device 20 upon which, or through which, the interaction occurred (e.g., a medium access control (MAC) address of the consumer user device, an advertiser identifier associated with the device, or other device identifier); an identifier of a consumer associated with the consumer user device upon which, or through which, the interaction occurred (e.g., an identifier of a user profile account having information about the user that interacted with the offer, such as name, address, offer preferences, and the like); an identifier of a session during which the interaction occurred; an identifier of an interaction-specific offer code (e.g., a single-use code dynamically generated when presenting the offer and that when presented for redemption, either in-store or on-line, identifies (e.g., uniquely) the corresponding interaction record); a publisher-specific offer code (e.g., an offer code for a given publisher that facilitated the interaction and that uniquely identifies the publisher when the offer is presented for redemption); an interaction type (e.g., a nominal value indicating on-line redemption, in-store redemption with a coupon code, in-store redemption by mobile device screen, in-store redemption by mobile device display, in-store redemption by mobile device wireless interaction with a point-of-sale terminal, in-store redemption with a printed copy of the offer, on-line or in-store redemption with a card-linked offer account, on-line or in-store redemption with an electronic wallet account, or the like); an interaction location indicating, to the extent known, a geographic location at which the interaction occurred (e.g., an identifier of a merchant's physical store, a geocoded IP address of a consumer user device used in the interaction, a location sensed by a location sensor in the consumer user device, or the like); a time of the interaction (e.g., a timestamp); a merchant associated with the interaction (e.g., a merchant through which the offer was redeemed, which in some cases may be different from the merchant that issued the offer, for example, for offers issued by brands redeemable at various retail stores); an inventory of goods or services purchased during the interaction (e.g., a plurality of transaction records listing items purchased and corresponding purchase amounts for calculating an aggregate value for the transaction upon which publishers are compensated in some cases); a transaction currency; and a consumer-user-device type of the device upon which the interaction occurred or was facilitated (e.g., an indicator of whether the consumer user device is a cell phone, tablet, personal computer, laptop, set-top box, in-dash automotive computer, a wearable computing device, or identifying a maker or software provider for the device).

Such fine-grained transaction data is expected to facilitate relatively reliable compensation of publishers by merchants, aligning the interests of the two groups, and relatively high-resolution analytics of consumer activity for improving the design of offers and publisher content. For instance, some merchants may compensate publishers for offers being printed or sent to another device even when the ultimate redemption of the offer in-store is not recorded by an interaction record. Often, when using traditional affiliate-network systems, in-store sales clerks will scan an offer barcode from a printout at their register, rather than scanning the barcode presented by the consumer, because doing so is a simpler and repetitive action, but in doing so, the publisher is potentially denied credit they might otherwise obtain from scanning a publisher-specific or single-use bar code on the printout our consumer user device display. Tracking printing and various transfers of offers between devices and accounts offers merchants a supplemental metric for determining publisher compensation and encouraging desirable publisher efforts to distribute offers.

Thus, the affiliate-network data store 28 may store values related to the provision and tracking of offers on-line and in stores. The affiliate-network data store 28 may be operative to filter, search, join, sort, augment, create, delete, modify, and search the above-mentioned records in a variety of permutations of subsets of the records. It should be noted that not all embodiments include all of the fields discussed above with reference to the affiliate-network data store 28 and that some embodiments store additional fields or use the above-mentioned fields for different purposes than are described, which is not to suggest that any other feature described herein may not also be omitted or used in a different fashion than is described.

In some embodiments, the content-negotiation module 30 is configured to dynamically format offer content according to the manner in which offers will be displayed to a consumer. In some embodiments, each offer is associated with an offer-specific URI (e.g., a uniform resource name (URN) or locater (URL)) that corresponds to multiple presentation formats of the offer appropriate for different devices or accounts. (And in some cases, the URI is both offer specific and publisher specific, as explained below.) The content-negotiation module 30 may be configured to form (e.g., select among or dynamically generate) these presentation formats based on attributes of the consumer user device 20 upon which the offer will be displayed or (i.e., and/or) attributes of an account through which the offer will be conveyed to a user (e.g., an email account, a social networking account, a card-linked offer account, or an electronic wallet account).

To this end, the content-negotiation station module 30 may be configured to receive data about the type of presentation (e.g., device attributes or account attributes) with a variety of different techniques. In some cases, a request from a consumer user device 20 to the affiliate-network system 12 for offer content corresponding to a URI includes user agent information about the consumer user device 20, such as a user agent string in a header of a request specified by a transport protocol (e.g., HTTP or SPDY). In some cases, the user agent information may be included with a get request under the transport protocol for resources at the URI. User agent information may include an identifier of a web browser, an operating system, a listing of accepted media types, supported character sets, encodings, languages, and the like. In some cases, the request for content at the offer URI includes information about the manner in which the offer will be displayed, for example, a screen size expressed in resolution or absolute geometric dimensions, a window size expressed in pixels or geometric dimensions, color capabilities, three-dimensional capabilities, and the like. In some cases, the request indicates whether the offer will be displayed on a printout from a printer, or whether the offer will be displayed in a particular type of account, such as those listed above.

In some cases, the request is not a sufficiently-specified description of how the offer will be displayed, and the content-negotiation module 30 may send instructions to the requesting consumer user device 20 to further identify such attributes, such as JavaScript™ that when executed returns a window size, a screen resolution, and i-frame size, a div-box size, a document-object-model (DOM) element size, or the like, within which the responsive offer content will be displayed. The code, when executed in a web-browser of a consumer user device 20, may return the corresponding parameters to the content negotiation module 30. In some cases, the request is from a native application executing on a consumer user device 20, and the request is received via the API server 24. An API of the affiliate-network system 12 may specify that requests include the above-mentioned information about the consumer user device 20 or account, or embodiments may send a default format of offer content when such information is unavailable.

In some embodiments, the content-negotiation module 30 is configured to retrieve the appropriate offer content for the URI (e.g., offer resources, like prose descriptions and images, and instructions for displaying the resources and, in some cases, for providing offer-selection interfaces for a given offer) based on the data indicating how the offer will be displayed. For example, the content-negotiation module 30 may receive data indicating that the offer will be displayed on a mobile phone, tablet, laptop, or desktop computer in a web browser, email account, text message, social networking account, card-linked offer account, electronic wallet account, or the like. In response, the module 30 may form (e.g., select or generate) an offer presentation template corresponding to one of these types of presentation. Thus, some embodiments of the content-negotiation module 30 may store in memory a plurality of different offer presentation templates, each template corresponding to a different type of consumer user device, presentation environment on a consumer user device, or account through which the offer will be presented to a user. Or in some cases, some or all of the offer templates are dynamically generated according to the type of presentation, for example, dynamically scaling dimensions, image resolutions, and font sizes with the size of the display of the consumer user device 20 or size of a window or DOM element in which the offer content will be shown.

An offer template, in some cases, specifies text to be included in offer content, for example, specifying the inclusion of more expansive prose descriptions of offers in templates for larger display screens or accounts in which longer bodies of text are appropriate (like in email, as opposed to text messages). In some cases, shorter and longer version of offer descriptions are maintained in the offer records for this purpose. Similarly, offer templates may specify larger fonts, higher-resolution images, and more images, in templates for larger display screens or for accounts configured to accommodate richer content. Thus, the offer templates may include instructions to retrieve and display various offer-related resources, such as a merchant logo, an offer-specific image, a prose description of the offer, and a description of various terms and conditions of the offer. In some cases, various versions of the offer content are maintained in the offer data store 40, such as lower and higher resolution versions of images, and more concise and less concise versions of text, and the offer templates may specify these different versions depending upon the type of presentation to the consumer.

Offer template selection may also depend upon the potential use of a consumer user device 20 for in-store redemptions (e.g., templates may differ for mobile phones and desktop computers to account for the potential presentation of the mobile device in-store). In some implementation, templates for printing offers (e.g., those that provide printable views of offers in black-and-white and are sized for A4 paper) may include a barcode image (or QR code, or the like) that can be scanned at a point-of-sale terminal for redeeming an offer. Templates for use on mobile user devices may include such images as well (e.g., by specifying that when the template is populated for a given offer, a barcode image for that offer is generated or retrieved and added to offer content formed based on the template). Images for optically-machine-readable codes, like barcodes and QR codes, may be included in (e.g., linked to with a URI) the above-mentioned offer records. Or some embodiments may generate publisher-specific, user-specific, or session-specific optically-machine-readable codes that uniquely identify one of these items. The code may be associated with a publisher record, a user profile, or an interaction record, depending on the application, and after the code is scanned at a point-of-sale terminal, the respective item (e.g., publisher record, user profile, or interaction record) may be associated with the transaction at the point-of-sale terminal to track publisher, user, and offer metrics.

In some cases, the offer templates include (e.g., specify, in part, how to form) interfaces by which a user further interacts with offers. Examples of such interfaces include on-screen buttons that, when selected (e.g., by touching or clicking), launch a client-side script or routine that issues a request from the consumer user device to the affiliate-network system 12 for a different presentation of the offer, such as a printable view. With a similar process, other included interfaces (e.g., buttons, voice commands, or gestures) may indicate that the offer should be sent to another consumer user device 20 or account, such as a button to launch an interface for entering a phone number to which offer content is texted or an email account to which an email version of offer content is sent. In some cases, the set of interfaces are different for the different templates.

In some cases, the offer templates include publisher-specific attributes of offer content that are formed (e.g., selected or generated) based on the identity of the publisher that advanced the URI to a consumer user device 20 (which then requests corresponding offer content from the affiliate-network system 12). To this end, in some embodiments, the content-negotiation module 30 may parse from the request for offer content an identifier of a publisher, and the module 30 may retrieve information for populating the template based on publisher-specific content, such as images and other attributes like colors, fonts, links, and text. For example, offer content may include one or more on-screen buttons, and an offer template may specify a publisher-button-color field for determining the button color. In response, when populating this template for a URI advanced by a given publisher, the content-negotiation module 30 may retrieve from the publisher data store 38 that publisher's selection of a color of the button and form offer content in accordance with the selection. Similar fields may specify other aspects of offer content. Thus, in some embodiments, different publishers may direct consumers to the same offer with different colors, publisher logos, publisher's terms of use, links to other publisher content, links to publisher help webpages, and the like.

In short, the content-negotiation module 30 customizes offer content based on context. In some embodiments, the visual depiction of an offer may depend on the attributes of the consumer user device 20 upon which the offer will be displayed, the type of account through which the offer is presented, and the publisher from which the consumer user device 20 received the URI of the offer. The content-negotiation module 30 may populate the templates based on responsive resources and send instructions to the consumer user device 20 to display the offer content.

In some embodiments, the affiliate-network system 12 includes a dynamic-terms offer controller 32 that dynamically adjusts the terms of offers (e.g., types of redemption, expiration date, start date, percent discount, and the like) based on feedback from the tracking data store 42, which may indicate both an amount of on-line redemption activity and off-line (such as in-store) redemption activity. Some embodiments of the dynamic-terms offer controller 32 perform a process described below with reference to FIG. 11. The affiliate-network system 12, as noted above, tracks offer interactions across multiple channels. A benefit of this approach is that offers can be dynamically controlled relatively reliably based on relatively comprehensive accounting of offer usage or likely usage. (Though, not all embodiments necessarily provide these benefits.) For instance, a merchant may specify that the percent discount of an offer is to decrease by some amount (or the offer is to expire) automatically in response to the aggregate of on-line and off-line interactions exceeding a threshold rate or amount, thereby constraining offers that have spread more widely than anticipated or potentially specify a greater discount than the merchant intended to offer due to a data entry error. In some cases, these thresholds are set automatically, for instance at five standard deviations of an aggregate rate (e.g., a daily average) of accumulation of offer interaction records for offers for a given merchant, and alerts are issued to the merchant in response to the threshold being exceeded so that the merchant can manually intervene and terminate or adjust an offer if needed.

In some embodiments, the affiliate-network system 12 further includes the analytics module 34, which may be configured to query data from the tracking data store 42 and present role-specific reports to publishers, merchants, and administrators of the affiliate-network system 12. Examples of reports are described below with reference to FIGS. 9 and 10. The analytics module 34 may be operative to receive a request for such a report specifying various criteria, such as a merchant account or a publisher account, query the tracking data store 42 for the responsive data, and generate visual depictions of the data, such as those described below. Reports that account for both on-line and off-line interactions with offers are expected to simplify the process of monitoring and analyzing offers that are redeemable through multiple channels, an undertaking which can be relatively arduous with traditional affiliate-network systems, particularly for merchants issuing hundreds of new offers each day. (Though, again, not all embodiments necessarily provide this benefit.)

Some embodiments of the affiliate-network system 12 implement techniques to protect user privacy, for example, anonymizing identifiers of consumer user devices 20 by hashing information from the consumer user devices 20, reducing the granularity of attributes recorded in association with user interactions (like rounding less significant digits of latitude and longitude coordinates), and providing privacy-controls by which consumers or publishers can implement user privacy-preferences.

In summary, the affiliate-network system 12, in some embodiments, is operative to coordinate activities relating to offers by web-scale numbers of consumer user devices 20, merchant systems 16, and publishers 18, which may implicate potentially hundreds of thousands or millions of offers, some of which may be dynamically adjusted with terms that change over time, some of which may have visual depictions that are dynamically adjusted, and some of which may have single-use offer tracking codes corresponding to an individual consumer interactions with offers. To accommodate operations at these scales, in some cases, the affiliate-network system 12 may include a relatively large number of geographically distributed networked computing devices and employ various techniques to speed operation, such as use of elastic scaling of the system 12 and use of content-delivery networks.

FIGS. 2 through 6 are a flowchart showing an embodiment of a process 44 for distributing offers both on-line and off-line (e.g., in-store or through multiple devices or accounts). Some embodiments of process 44 are performed with the affiliate-network system 12 described above, though it should be noted that embodiments are not limited to the particular features of that system 12. The flow charts of FIGS. 2 through 6 are arranged in four columns, each column corresponding to the role of a different entity and associated computing hardware performing parts of the process 44. In other embodiments, the various roles of the different entities may be arranged differently, for example, the merchant may operate the affiliate-network system, the affiliate-network system and the publisher server may be operated by the same entity, or the merchant system, affiliate-network systems, and the publisher server may all be part of the same system operated by the same entity, depending upon the arrangement. Embodiments of the process 44 may be effectuated by one or more data processing apparatuses, examples of which are described below with reference to FIG. 17, executing instructions stored on a tangible, non-transitory, machine-readable medium, such as various forms of computer memory like, dynamic random access memory and persistent storage in the form of hard drives or optical media.

The process 44, in some embodiments, describes the life-cycle of an exemplary offer, beginning with the creation of accounts of merchants and publishers, followed by the offer being defined by the merchant, an affiliate-network system distributing the offer to the publishers, the publisher making a consumer aware of the offer, the consumer redeeming the offer either in-store or on-line, and arrangements being made for compensation of the publisher by the merchant based on tracking of the offer redemption or other interactions with the offer. Like the other embodiments described herein, various portions of the process 44 are directed to different problems with existing affiliate-network systems, such as those described above, and as such, subsets of the process 44 are expected to be independently useful, which is not to suggest that any other features described herein cannot also be omitted in some embodiments.

Figure 2:
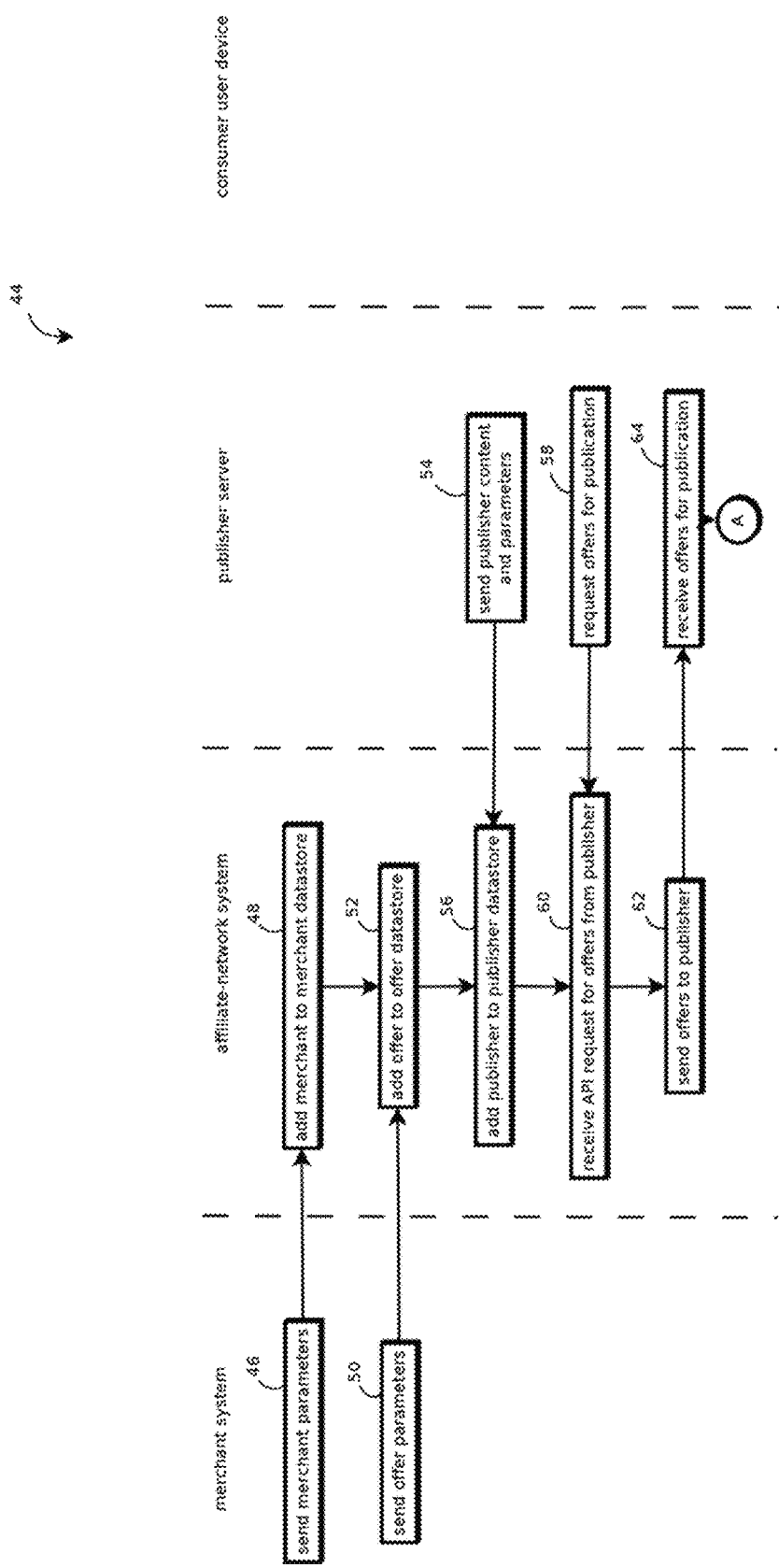
FIGS. 2 through 6 show an example of a process for distributing offers redeemable both on-line and off-line in accordance with some embodiments.

In some embodiments, the process 44 begins with the merchant system sending merchant parameters to the affiliate-network system, and the affiliate-network system adding those merchant parameters to a merchant data store, as indicated by blocks 46 and 48 in FIG. 2. The merchant parameters may include some or all of the fields in the merchant records described above with reference to the merchant data store 36 of FIG. 1. In some cases, the merchant parameters are provided through a website interface hosted by the affiliate-network system. This website may include interfaces by which a merchant can populate a merchant record (or an administrator of the affiliate-network system may enter those parameters on behalf of the merchant). The merchant system may include an employee's user device by which the employee provides the merchant parameters via email or a via a web browser, in some cases. In some use cases, the merchant parameters define a merchant account with associated merchant employee accounts with usernames and passwords for granting various levels of access to merchant employees based on the amount of authority granted by the merchant to those employees. The merchant parameters may be stored in one of the above-mentioned merchant records, and a unique merchant identifier may be created for the merchant record to distinguish the merchant record from those of other merchants.

Next, in some embodiments, the merchant system sends offer parameters that specify an offer the merchant wishes to have distributed, and the affiliate-network system adds the offer parameters to an offer data store, as indicated by blocks 50 and 52. In some cases, the offer parameters include some or all of the fields of an offer record described above with reference to the offer data store 40. Sending the offer parameters may include an employee of the merchant logging into a merchant account in the affiliate-network system with a username and password that indicate the employee is authorized to create an offer on behalf of the merchant. The affiliate-network system may host a website interface by which the employee of the merchant enters the offer parameters, or the employee the merchant may provide those parameters via email or phone call or other form to an administrator of the affiliate-network system who then enters the offer parameters. In some cases, the affiliate-network system provides an API by which a merchant can programmatically submit a command to add an offer to the offer data store along with data specifying the offer parameters in a format specified by the API. The offer parameters may be stored in one of the above-mentioned offer records, and an arbitrary but unique offer identifier may be created for the offer record.

In some cases, each offer record includes values indicating the state of the offer in an offer approval work-flow. For example, a value in the record may indicate that the offer has been created, that the offer has been sent to an employee of the merchant for approval, or that the offer has been approved by an employee of the merchant with authority to approve offers. In some cases, different roles defined by merchant records may specify which employees have authority to create offers or approve offers. Interfaces to solicit changes in state within such work-flows may be hosted by the affiliate-network system, such as in web-based interface by which an employee can approve an offer or reject an entered offer. Such controls are helpful for merchants that manage a relatively large number of offers, any one of which could potentially be relatively expensive to the merchant were a mistake made in defining an offer, for example, by making an offer that is more generous than the merchant intended. Not all embodiments, however, include these features, which is not to suggest that any other feature cannot also be omitted.

The process 44, in some embodiments, includes a publisher server (or a publisher employee or a publisher employee's user device) sending publisher content and parameters to the affiliate-network system to define a new publisher account, and the affiliate-network system adding the publisher to a publisher data store, as indicated by blocks 54 and 56. In some cases, the publisher parameters and content may include some or all of the contents of the publisher records described above with reference to the publisher data store 38 of FIG. 1. In some cases, the publisher parameters are provided through a website hosted by the affiliate-network system, the website presenting interfaces (e.g., text box inputs, check boxes, radio buttons, file-uploaders for images) by which a publisher can populate a publisher record and upload publisher content. Or publishers may send this information to an administrator of the affiliate-network system who then creates the publisher record in the publisher data store. As noted above, in some embodiments, publisher records include data for customizing the presentation of offers according to the identity of the publisher such that when one publisher sends a consumer a URI of a given offer, the offer appears differently on the consumer's user device relative to how that offer would appear had a different publisher sent the same consumer the same offer. As noted, examples of such customization include button color, logos, links to other publisher content, and the like. In some cases, the URIs for offers sent to a given publisher include the name of the publisher, such that the appropriate publisher-specified visual attributes of offers can be retrieved and applied when a consumer user device requests offer content. In some cases, the portion of the URI identifying the publisher is provided by the publisher and is stored in a publisher record. Customizing the URI and visual aspects of offers content by publisher is expected to make the affiliate-network system more desirable to publishers who may otherwise be concerned with distinguishing their brand from that of other publishers, while still providing a single, centralized system through which offer content is retrieved and through which consumers interact with offers, such that both on-line and off-line interactions with offers can be tracked. (Though not all embodiments necessarily provide these benefits.)

It should be noted that process 44, like the other processes described herein, is not limited to the sequence illustrated. For example, in some cases, publishers may be added to the publisher data store before merchants are added to the merchant data store, and in some cases, multiple merchants, multiple offers, and multiple publishers may be added at various points during the process 44, and multiple instances of portions of process 44 may be performed concurrently (e.g., thousands of offers may be provided to millions of consumers at various times, and publishers, merchants and offers may be added at various times). The steps 46-56 are merely exemplary steps illustrating the accumulation of data in the affiliate-network system for distributing offers.

The process 44, in some embodiments, includes the publisher server requesting offers for publication, and receiving this request through an API at the affiliate-network system, as illustrated by blocks 58 and 60. In some cases, the publisher server may periodically submit requests for offers (for instance, as a batch process run hourly or daily), or the publisher server may request offers for publication in real-time (for example, in response to a request from a consumer user device to the publisher server for offers). In some cases, the request may specify criteria by which offers are to be selected. For example, the publisher may request offers specific to a geographic area, a category of goods or services, a particular redemption channel (e.g., on-line or in-store), a category of merchants, a particular merchant, or a particular time period for expiration or publication (e.g., offers published since the last time offers were requested by that publisher).

In response to the request, the affiliate-network system may retrieve responsive offers (e.g., from the offer data store 40 of FIG. 1) and send those offers to the publisher server, which may receive the offers for publication, as indicated by blocks 62 and 64. In some cases, the request for offers identifies the publisher, for example, with a publisher user-name and password provided in the API request, and the responsive offers are filtered according to merchant selections either blacklisting or whitelisting publishers, as some merchants do not wish their offers to be associated with publishers inconsistent with the merchant's brand. In some cases, a plurality of responsive offers satisfying both the publisher's criteria and merchants' constraints are sent. Offers may be sent, for example, in a serialized data format, such as JSON or XML, to the publisher server according to a format for offers defined by the API. In some cases, sending an offer includes sending some or all of an offer record stored in the offer data store 40.

Sending offers may include creating a publisher-specific URI for each offer (e.g., a URI that resolves to an Internet Protocol (IP) address of the affiliate-network system and includes the name of a publisher and the unique offer identifier), such that when the publisher sends that URI to a consumer user device, the consumer user device retrieves publisher-specific offer-content from the affiliate-network system, and the name of the publisher in the URI gives the consumer confidence that they are viewing content "from" a publisher with which they are familiar.

The publisher server may store the received offers in a database of the publisher, such that the publisher can later query the database for offers responsive to requests from consumer user devices. Code executing on the publisher server may parse the API response and update a publisher database with records for the offers in accordance with a publisher's data model for offers. Or for real-time presentation via the publisher, the publisher server may immediately send a consumer user device instructions to display the offers, along with information by which a visual presentation is constructed. The offers received by the publisher, in some embodiments, are not accompanied by scripts, markup data, and styling data for presenting a visually pleasing offer presentation. Rather, publisher servers use the data provided via the API to construct such presentations on consumer user devices according to the particular website or application of the publisher. (Though some embodiments may also provide such scripts, markup data, and styling data with the offers sent to the publisher.)

In some cases, the publisher processes the received offers prior to receiving a request for offers from consumer user devices or prior to responding to such requests. For instance, some publishers may index offers for faster offer retrieval according to various indices (e.g., like keywords, redemption channel, geographic area, and the like). Some publishers may associate offers with accumulated consumer feedback, e.g., upvotes or downvotes for offers or ratings of offers by consumers, and rank offers based on such feedback or index offers according to key words in commentary. Offers may be ranked according to a variety of geographic, user-specific, or offer-specific criteria, including an expected return to the publisher for a given ranking of the offer based on historical redemption rates for a given offer and for offers and consumers having various criteria similar to those at issue when ranking occurs.

Figure 3:
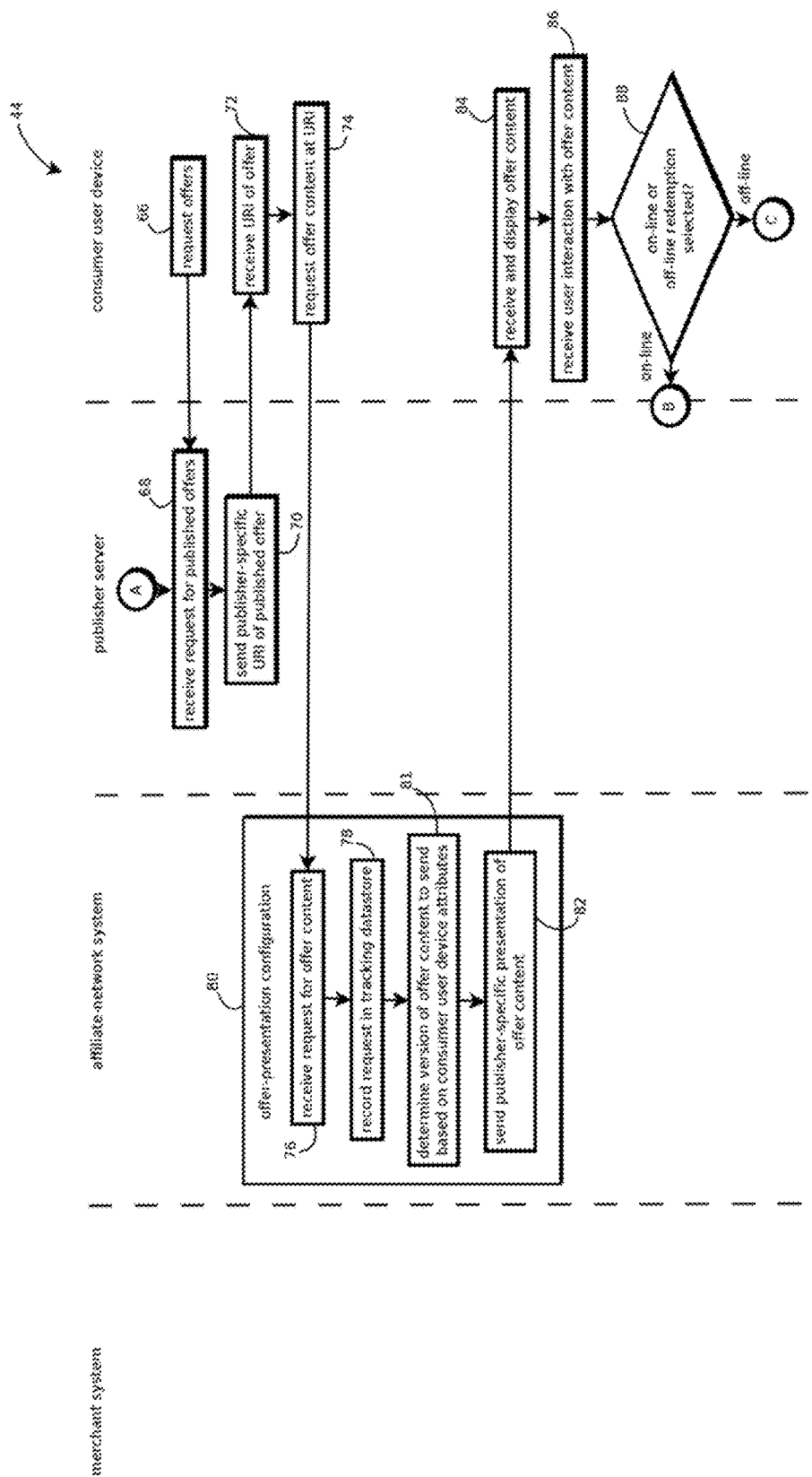

As illustrated, the process 44 continues in FIG. 3. Some embodiments include receiving, at the publisher server, a request for published offers from a consumer user device, as indicated by blocks 66 and 68. As noted above, the consumer user device may be any of a variety of different types of computing devices, including mobile phones, tablet computers, laptop computers, desktop computers, set-top computers, in-dash automotive computers, gaming consoles, wearable computing devices (such as smart watches or head-mounted displays), public kiosks, and the like. The request for published offers may be initiated by a consumer interacting with a web browser or native application executing on the consumer user device, for example, by a user navigating to a publisher's webpage and interacting with that webpage to request offers satisfying certain criteria. Or the request may come from a user interacting with a native application for displaying offers, such as a barcode scanning application on a mobile device, or an application for displaying and discovering offers on a mobile device. In some cases, the request for offers is initiated by a background process executing on the mobile device, for example, a lock-screen-application on a cell phone that displays offers to users automatically, an application on a mobile device for alerting consumers to offers based on the current geographic location of the user being proximate to a geolocation (e.g., within or a threshold distance) at which an offer is redeemable, or a social-networking application through which the user receives alerts for offers identified for the user by their friends.

In response to the request, the publisher server may identify responsive offers and send to the consumer user device a URI of the published offer (e.g., a publisher-andoffer-specific URI), as indicated by blocks 70 and 72. In some cases, a plurality of offers are determined to be responsive to the request, and a plurality of corresponding publisher-and-offer-specific URI's are sent to the consumer user device, in some cases along with instructions to display information about the offers to the consumer. In some embodiments, the information sent from the publisher to the consumer user device includes most or all information needed to construct an initial display of each offer, and that initial display includes a link to the URI sent with the offer to the publisher, such that when the user selects that link, additional information about the offer is retrieved according to the URI.

In other cases, the publisher sends instructions to the consumer user device to retrieve information identified by the URIs without further interaction by the user (or such instructions may be present within a native application executing on the consumer user device). For example, the publisher server may send a webpage with a plurality of otherwise empty offer containers, each referencing a URI, and the consumer user device may automatically request content to populate each of those containers (e.g., div-boxes, i-frames, or other DOM elements) with content identified by the respective URIs. As noted above, the URIs may resolve to the affiliate-network system (e.g., on a different domain from the publisher) and, in some cases, include an identifier of the publisher.

The consumer user device, in some embodiments, request offer content identified by each URI from the affiliate-network system, as indicated by blocks 74 and 76. Requesting this content from the affiliate-network system rather than the publisher server provides a number of benefits, including more comprehensive tracking of consumer interactions with offers than is generally available in traditional affiliate-networking systems, which often host the offer content, in its entirety, on the publisher server. For example, embodiments of the affiliate-network system may centrally track interactions selecting the option to print an offer, send an offer as a text message to a phone number, share the offer in a social network, or send the offer to some other account, such as an electronic wallet or card-linked offer account. In contrast, systems that rely on self-reporting by publishers can be difficult to administer and properly audit. (Though not all embodiments necessarily provide these benefits, as some embodiments address other, independent problems with existing systems.)

In some embodiments, the request for offer content itself constitutes one type of interaction tracked in one of the above-mentioned interaction records in the tracking data store 42 of FIG. 1. In some cases, publishers may be compensated for merely presenting offers, regardless of whether the consumer interacts further with the offer, for example, by redeeming the offer. Thus, some embodiments include a step of recording the request in a tracking data store, as indicated by block 78. Recording the request may include populating some or all of the above-mention fields in an interaction record described above based on the request. To credit the publisher, the publisher's identity may be parsed from the request for offer content at the URI from the consumer user device, or a publisher's script or native application on the consumer user device may identify the publisher, e.g., with an API request including the publisher's identity.

In some embodiments, receiving the request for offer content at the affiliate-network system initiates an offer-presentation configuration process 80 that is a subroutine of the process 44 (which is not to suggest that other portions of the process may not also constitute independently useful subroutines). The offer-presentation configuration process 80, in some implementations, customizes the visual presentation of offers based on one or more of the following: the publisher that identified the offer to the consumer; or attributes of the consumer user device (including a printer) or account in which the offer will be viewed. These activities may be performed by the above-described content-negotiation module 30. In some cases, the process 80 includes determining a version of offer content to send based on consumer user device attributes and determining and sending a publisher-specific presentation of the offer content, as indicated by blocks 81 and 82. Examples of dynamically customized offer presentations are described below with reference to FIGS. 7 and 8. To simplify offer management and presentation for publishers, the same URI may yield different visual presentations of the offer appropriate to those devices or accounts.

The consumer user device may receive and display the customized offer content, as indicated by block 84. The offer content may be displayed in a web browser or a special-purpose native application, depending upon the use case, and some embodiments of the affiliate-network system provide offer content for both types of use cases. In some embodiments, the offer content specifies user interfaces for further interacting with the offer content, such as buttons, gestures, text inputs, voice inputs, or the like, for the consumer to express an intent to take further action with respect to a specific offer. The interfaces may be configured such that user selections of a given interface results in the user selection being reported to the affiliate-network system along with data identifying the publisher (e.g., with the request itself or with a session identifier associated with the publisher). Examples of such further actions include printing the offer, texting the offer to a cell phone number, emailing the offer to an email address, sending the offer to a card-linked offer account, or sending the offer to an electronic wallet. Other examples include taking action to facilitate on-line redemption of the offer, such as revealing an otherwise concealed or withheld coupon code or loading such a coupon code to a clipboard memory of the consumer user device, for instance, with a native mobile application or a flash object executing within a web browser, the flash object having heightened security privileges relative to the default privileges afforded scripts executing within a web browser for accessing clipboard memory.

The process 44 further includes receiving user interaction with the offer content at the consumer user device, as indicated by block 86. In some cases, the consumer user device executes an event handler that launches various routines depending upon a user's input, and those routines may initiate the requested actions, such as requesting the affiliate-network system to send the offer to some other device or account. Depending on the type of the user's interaction, the process 44 takes different paths, as indicated by decision block 88 identifying alternate branches depending on whether on-line or off-line redemption was selected. In this embodiment, if on-line redemption is selected, the process 44 proceeds to the node labeled "B," which is continued in FIG. 4, or if a form of off-line redemption is selected, the process 44 proceeds to node "C," which is continued in FIG. 5.

Figure 4:
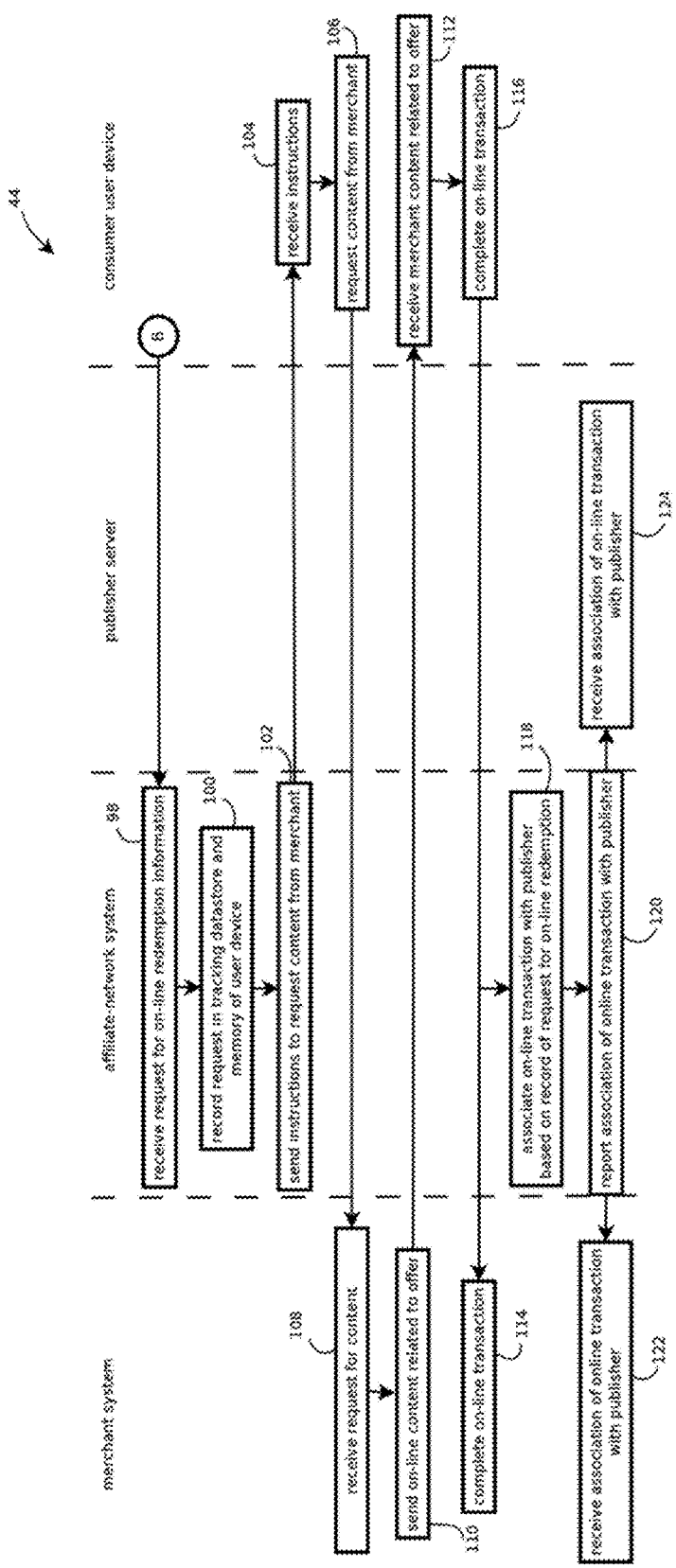

FIG. 4 shows an example of what happens following a consumer selection of on-line redemption. In this embodiment, the affiliate-network system receives, from the consumer user device, in response to the user's selection, a request for on-line redemption information, as indicated by block 98. The request may be a request for a coupon code, such as a code that is withheld from the consumer user device until requested or is concealed on the consumer user device until requested, or the request may be a request to navigate to the merchant's website. To prevent publishers from claiming credit for a consumer merely requesting content from the publisher's domain, some embodiments require that a consumer take an additional affirmative step of selecting an offer before the publisher is credited with the user's interaction, as some publishers have been known to send code to the consumer user device that indicates in memory that the consumer selected the offer without the consumer actually having done so, thereby potentially causing the publisher to be overcompensated by the merchant. (Though it should be noted that not all embodiments must include this policy.)

Next, in this embodiment, the request is recorded (e.g., documented) in the tracking data store and memory of the user device, as indicated by block 100. Recording the request in the tracking data store may include creating one of the above-mentioned interaction records described above with reference to FIG. 1. Recording the request in memory of the user device may include sending and executing code on the consumer user device (e.g. JavaScript™ code) that loads a value into persistent client-side storage remotely accessible to the domain of the affiliate-network system (e.g., in a cookie or in LocalStorage). Or some embodiments only use one of client-side and server-side storage, which is not to suggest that any other feature cannot also be omitted. The recorded request may include an identifier of the publisher, such that the publisher can be compensated for the consumer's interaction or for later interactions, like consumer redemption of the offer or consumers sharing the offer.

In some embodiments, the process 44 include both sending instructions to request content from the merchant to the consumer user device and receiving those instructions at the consumer user device, as indicated by blocks 102 and 104. In some cases, the instructions are a redirect command sent to the consumer user device along with code that instructs the consumer user device to store the request in a cookie or LocalStorage. The redirect command may cause the consumer user device to navigate to a merchant's website and, in some cases, to a specific webpage of the merchant associated with the offer (e.g., a product page) in an offer record in the above-mentioned offer data store 40.

The consumer user device, in response, may request content from the merchant, as indicated by block 106, and the merchant may receive this request and send the requested content back to the consumer user device, as indicated by blocks 108, 110, and 112. This requested content may be the merchant's webpage or content to be displayed in a merchant's native application executing on the consumer user device. In some cases, the consumer and the merchant then complete the on-line transaction, as indicated by blocks 114 and 116. Completing the on-line transaction may include the consumer selecting items or services for which the offer qualifies, providing payment information (e.g., identifying a credit card account, a card-linked offer account, or an electronic wallet account), and the consumer identifying the offer, for example, by entering a coupon code in a checkout page of the merchant. Examples of coupon codes include a relatively short, memorable string of text, like less than 50 characters, or some other token, such as an image that the user drags and drops into an interface on the checkout page. On-line redemption of the offer is another example of a consumer interaction tracked in an interaction record in the tracking data store 42 of some embodiments.

In some cases, the on-line transaction is associated with the publisher at the affiliate-network system based on the record of the request for on-line redemption by the consumer. In some cases, the checkout page of the merchant system includes instructions for the consumer user device to retrieve content from the affiliate-network system, and that content includes scripts or other instructions that retrieve the identifier of the publisher from the persistent client-side memory of the consumer user device, for instance, by reading a cookie or querying LocalStorage. Many browsers enforce a single-origin policy for security reasons that only permit access to such memory by the domain that wrote to the memory. Accordingly, the affiliate-network system may be able to retrieve the value identifying a publisher when the merchant cannot. In other embodiments or use cases, the publisher may be associated with the transaction based on a publisher-specific coupon code manually entered by a consumer in the merchant checkout page or an identifier of the publisher associated with the offer in a consumer's account, such as a card-linked offer account or an electronic wallet account used to pay for the transaction. In some cases, the association with the publisher is maintained in one of the above-mention interaction records. The process may include associating an on-line transaction with a publisher based on a record of a request for the on-line transaction, as indicated by block 118.

The process 44, in some embodiments, further includes steps to compensate the publisher and bill the merchant for the publisher's contribution to the transaction. This may include reporting the association of the on-line transaction with the publisher from the affiliate-network system to both the merchant system and the publisher server (or publisher employees), as indicated by blocks 120, 122, and 124. Reporting the association may include calculating the amount owed by the merchant to the publisher or the affiliate-network system operator. In some cases, aggregate counts or rates are reported, and specifics of each transaction are maintained in memory for auditing those amounts owed. In some cases, the amount owed for a given transaction is a function of the total amount spent in a transaction between the consumer and the publisher, and a total amount of the consumers purchase is reported by the merchant to the affiliate-network system, for example, directly in association with a session identifier that is also tied to the consumer's request for content at checkout, or via a request for content itself. Steps 122 and 124, as illustrated, complete the branch of decision block 88 of FIG. 3 for on-line redemption of an offer in this example.

Figure 5:
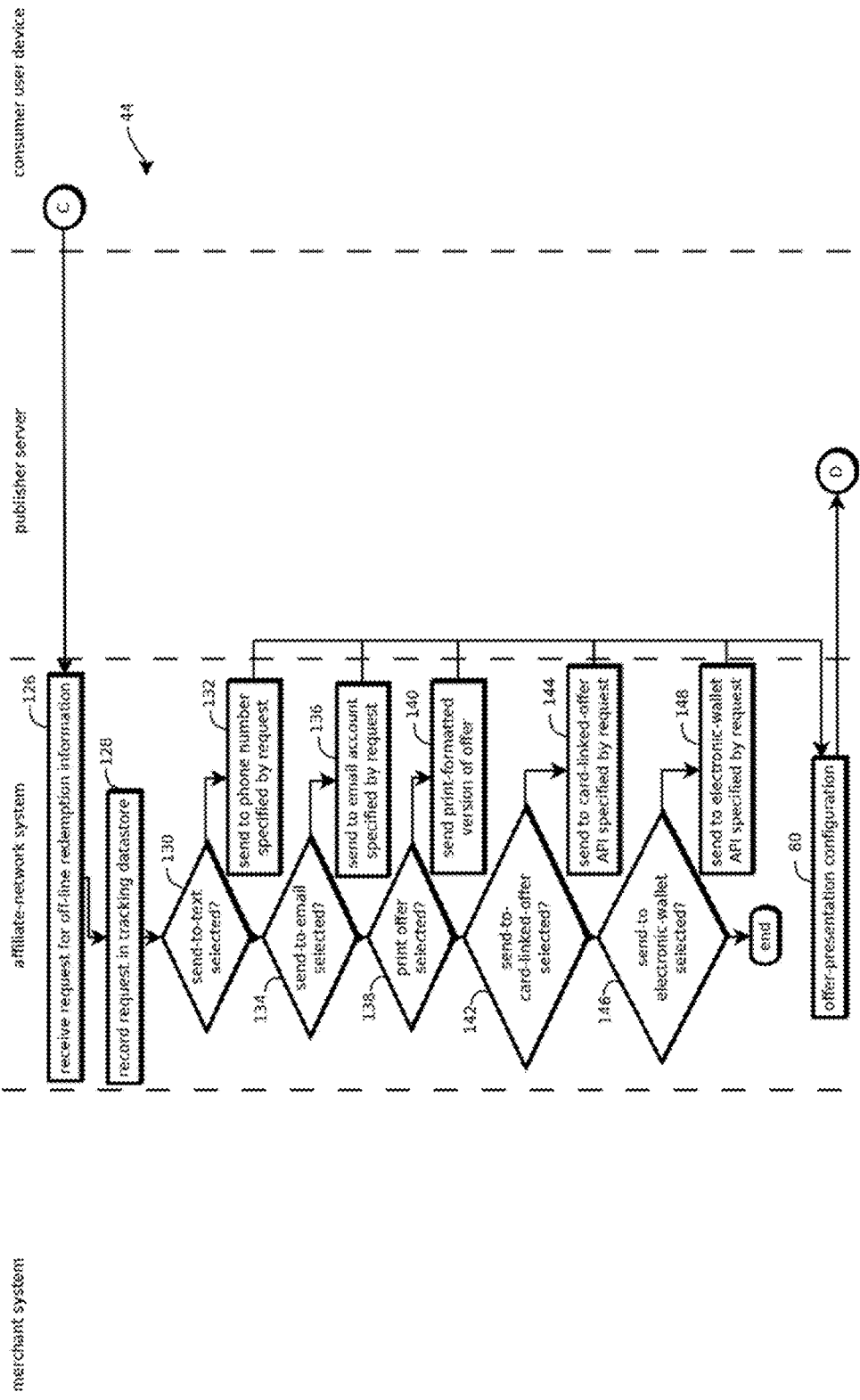
Figure 6:
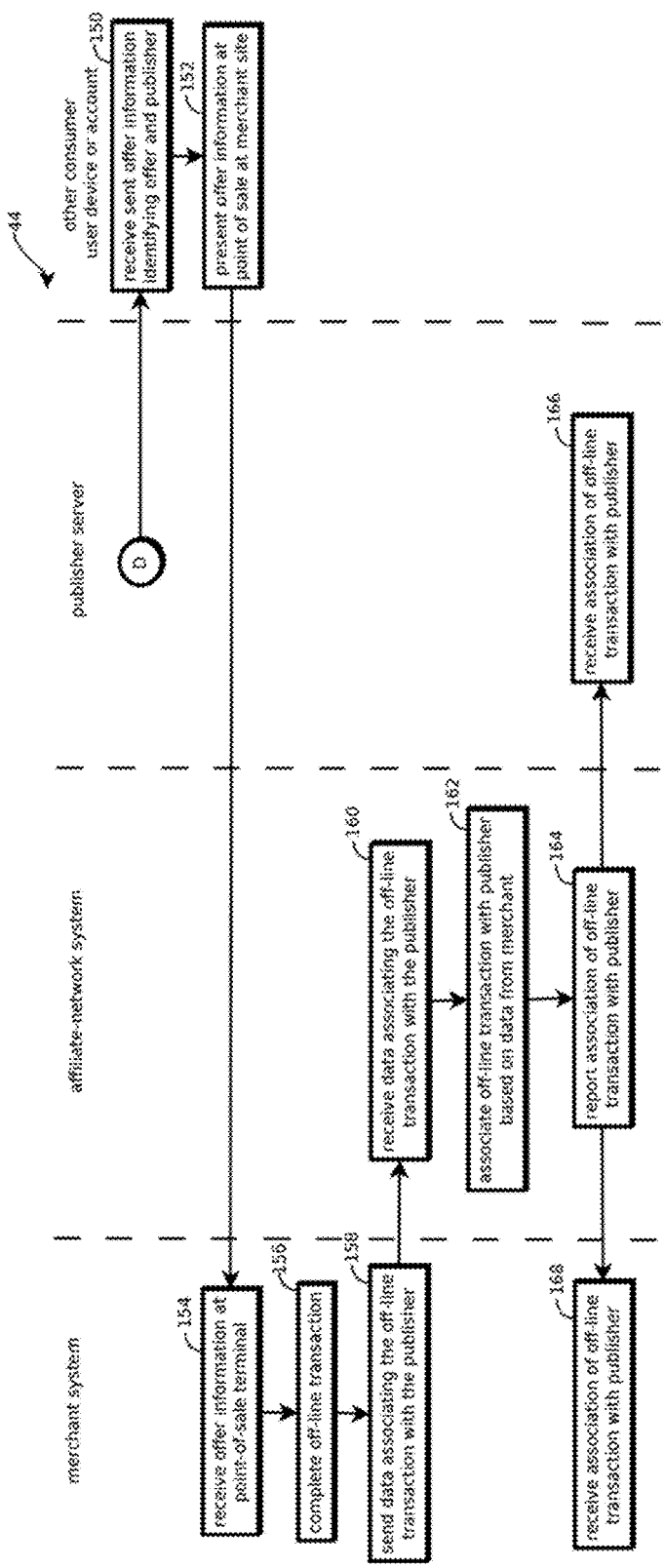

FIGS. 5 and 6 show a branch of process 44 for off-line redemption of an offer following from node "C" of decision block 88 in FIG. 3. As noted, examples of off-line redemption include in-store redemption or redemption (or actions to facilitate redemptions) via other devices or accounts. Upon a user interacting with offer content such that an intent for off-line redemption is expressed, the consumer user device sends a request for off-line redemption information to the affiliate-network system, as indicated by block 126 in FIG. 5. The received request may include an identifier of the publisher that provided the offer to the consumer user device. The received request may then be stored in the above-mentioned tracking data store, as indicated by block 128, for example, in a new one of the interaction records described above. The corresponding interaction record may identify the publisher from which the consumer user device receive the offer and the type of redemption information requested, for example, whether the consumer requested redemption information to be sent to a phone number as a text message, to an email account as an email, to the consumer user device in a format suitable for printing, to a card-linked offer account, or to an electronic wallet account. The resulting interaction record may be used to determine compensation for publishers when the offer is redeemed on a different consumer user device or in-store.

With many existing affiliate-network systems, crediting publishers for off-line redemptions is difficult, because many such systems rely on client-side cookies for offer tracking that are not available when the consumer redeems the offer using a different consumer user device, a different account, or a printed copy of the offer. In some embodiments of the presently described processes and systems, the interaction record can be used as a basis for compensating publishers in these other contexts. Further, directing the request for off-line redemption information to the affiliate-network system consolidates such records with a single entity that can interface between merchants and publishers to determine such compensation.

Depending upon the type of off-line redemption information requested, the affiliate-network system takes various actions. Upon determining that the consumer selected a send-to-text option, the process 44 may send the offer via text message to a phone number specified by the request, as indicated by blocks 130 and 132. In some cases, the offer interface presented on the consumer user device includes a text-box input for the consumer to identify a phone number upon indicating that they wish to send the offer to a mobile phone as a text message. This phone number may then be sent to the affiliate-network system to complete the request for off-line redemption information. In other cases, a user profile is maintained (e.g., in client-side or server-side memory) that includes the phone number, and the number is retrieved from memory for sending information to a mobile phone. Sending the offer in this context may include sending a shortened description of the offer appropriate for mobile phone (for example, a one sentence summary followed by an offer code) or may include sending a hyperlink to the offer, such as a relatively short URL that links to a webpage for the offer. To accommodate a relatively small namespace afforded by short URLs, some embodiments may expire URLs after some duration, for example one year, and reuse the same URLs.

Later selections of the URLs on recipient mobile phones may be received at the affiliate-network system. Received selections may spawn new interaction records in the tracking data store that are associated with the corresponding offer and publisher. In some cases, consumers may send the offer to multiple phone numbers, for example, the phone numbers of their friends, and publishers may be compensated for multiple redemptions, thereby incentivizing publishers and merchants to interact with the affiliate-network system. Some embodiments may restrict the rate at which offers are sent to phone numbers to avoid abuse of the system by those sending undesired text messages to others, for example, by maintaining a count of text messages sent from a given consumer user device over some trailing duration, and determining prior to sending a new text message whether the count exceeds a threshold (e.g., 50 text messages per day). In some cases, a listing of phone numbers for which users have indicated they do not wish to receive offers is maintained, and before sending a text, the recipient number is verified to be absent from this list.

Some embodiments of the process 44 include determining whether send-to-email was selected on the consumer user device and, in response to such a selection, sending the offer to an email account specified by the request, as indicated by blocks 134 and 136. In some cases, the interface for interacting with offers presented on the consumer user device presents a text-box input upon a user selecting a button for sending the offer to an email account, and the user-entered email address is sent as part of the request to the affiliate-network system. In response to the selection, some embodiments may construct an email-specific and publisher-specific visual presentation of the offer with the above-described content-negotiation module 30 and send that presentation, for example, in an HTML formatted email, to the specified email address. In some cases, a listing of email addresses for which users have indicated they do not wish to receive offers is maintained, and before sending an email, the recipient email addresses verified to be absent from this list. Further, to reduce the likelihood of undesired emails being received, some embodiments determine whether the consumer user device has sent more than a threshold amount of emails within some trailing duration, using a process like that described above for text messages.

Some embodiments of process 44 determine whether the consumer selected a print-offer interface on the consumer user device and, in response, send from the affiliate-network system a print-formatted version of the offer, as indicated by blocks 138 and 140. Step 140 may include the content-negotiation module 30 described above constructing or selecting a publisher-specific and print-format specific visual presentation of an offer. In some cases, the print-formatted version of the offer includes a barcode, a QR code, or other optically-machine-readable identifier of the offer for presentation at a point-of-sale terminal and scanning, for example, with a barcode scanner or an optical scanner by a sales clerk. Some embodiments create an offer-specific, a publisher-specific, a consumer-specific, or a session-specific scannable code, such that a printout of the offer, when scanned at a point-of-sale terminal, yields data that can be tied to an offer, a publisher, a consumer, or a session with the affiliate-network system. For example, as described below, the merchant system may scan the code and store the code in memory in association with a merchant's record of the transaction. Merchant transaction records may also indicate the date and time, what was purchased, the purchase amount, the offer(s) that was (or were) redeemed during the purchase, and in some cases, the identity of the consumer. Some or all of the merchant record may be sent to the affiliate-network system to determine compensation of the publisher. In embodiments with publisher or session-specific codes, the code may be stored in the interaction record stored in step 128 to tie the publisher with the in-store redemption. In other embodiments, a merchant supplied code is repeated for each offer or a relatively large number of offers, such that the scannable code does not, by itself, identify the publisher or session. Some merchant systems are incapable of validating single-use offer codes and can only validate a relatively small number of codes that are re-used. In some use cases, some embodiments determine compensation for the publisher based on the interaction record, for example, in a compensation per print model.

Some embodiments of process 44 determine whether the consumer selected a send-to-card-linked-offer account option on the consumer user device and, in response to such a selection, send the offer to an account specified by the request via an API of the card-linked-account administrator, as indicated by blocks 142 and 144. Card-linked offers are digital coupons or other offers loaded a credit card, debit card, or store loyalty card account, such that when the respective card is presented during a transaction, the offer is redeemed based on the association of the offer with the account. In some cases, consumer's card-linked offer account information is requested upon selection of this interaction with a web form or other request for input sent to the consumer user device, e.g., with a request to a native application executing on the consumer device that manages the consumer's card-linked offer accounts. In some cases, the information sent to the API includes a command to load the offer to the appropriate account and an identifier either identifying the interaction record stored in step 128 or an identifier of the publisher that should be compensated in the event the offer is redeemed using the corresponding card. These identifiers may be used to determine compensation for the publisher when the offer is redeemed using the card, and either the merchant or the operator of the card-link-offer account may report this information to the affiliate-network system after (e.g., upon) redemption.

The process 44, in some cases, further includes determining whether the consumer selected an option to send the offer to an electronic wallet and, in response to such a selection, sending the offer to an electronic-wallet API specified by the request, as indicated by blocks 146 and 148. Examples of electronic wallet accounts include client-side electronic wallets (e.g., special purpose native applications executing on client-devices and implementing electronic wallet functionality) and server-side electronic wallets (e.g., systems that host consumer account information on a server that consumers access with a client-side "thin-wallet" application). Some client-side electronic wallet applications are configured for payment via NFC communication with a point-of-sale terminal and to provide payment information for online transactions (e.g., by populating checkout forms). During a transaction, the electronic wallet may electronically convey information to the seller to facilitate payment, along with information about offers being redeemed in some cases. Like the card-linked offer example above, the sent information may include a command to load the offer to the electronic wallet account along with identifiers of the publisher or the interaction record in the tracking data store. One or more of these identifiers may be used to determine compensation for the publisher, and the merchant or the entity operating or interacting with the electronic wallet account may report these identifiers to the affiliate-network system after redemption of the offer.

Thus, a variety of different off-line redemption channels are supported in the present example. And it should be noted that a variety of other redemption channels are consistent with the present techniques. For example, consumers may instruct the affiliate-network system to send the offer to social networking accounts of other consumers, such that the offer is presented within their friends' social networking accounts. In another example, consumers may share offers by transferring the offers to another consumer's user device with, for instance, a "bump" interface by which consumers physically bump their phones together, or with an on-screen gesture or interaction that instructs the mobile devices to exchange information via Bluetooth™, NFC, or other wireless connections with other, proximate mobile devices. Or consumers may instruct the affiliate-network system to send the offer to themselves via one of the channels described herein at some later date (e.g., as a reminder) or upon some condition obtaining (e.g., when the respective consumer's mobile user device enters some pre-defined geo-fence, such as one surrounding one of the stores at which the offer is redeemable or their home or work, as indicated by a publisher's native mobile application that is executing on the consumer's device and is configured to report location to retrieve such reminders). Each such request may generate a record in the tracking data store 42 described above, such that publishers can be compensated for various types of consumer interactions with offers that merchants find desirable.

Further, some embodiments may generate additional interaction records (or values in such records) tracing the path of an offer through a chain of consumers who share the offer with one another. In some cases, merchants or publishers may wish to reward consumers for sharing offers via off-line interactions. To this end, some embodiments store in interaction records a recipient identifier (or list of such identifiers). When a later interaction record is created for interaction by the recipient, existing interaction records are queried for those that include the recipient's identifier, and if the offer is the same, the earlier interaction record is updated with an identifier for the later interaction record. By tracing a chain of interaction records through such identifiers (which may be referred to as "links" or "pointers"), merchants and publishers may determine compensation for consumers who share offers, e.g., calculating an amount of compensation based on an percentage amount purchased by those with whom the offer was shared. In some cases, merchants or publishers may configure offer records that specify compensation at one or more links in a chain of transaction records that depends on multiple-downstream sharing events (e.g., at a decreasing rate for each subsequent sharing event), such that a single consumer can potentially be compensated for a relatively wide distribution of an offer if their friends share the offer widely to people who, then, themselves share the offer widely. In some cases, such records may also be queried by merchants or publishers to target marketing efforts to those consumers who historically have been relatively effective at distributing offers.

After determining the type of off-line transaction, embodiments of the process 44 execute the offer-presentation configuration process 80 described above with reference to FIGS. 3, as indicated by block 80 being repeated in FIG. 5. In some cases, configuration includes formatting the offer for the various implicated APIs and associating with the offer publisher information to determine compensation, or configuring the offer may include forming an email-appropriate visual presentation of the offer, or the above-mentioned text message presentations of offers. Templates specific to each configuration may be retrieved from memory, and the templates may be populated by retrieving resources and other information related to offers, publishers, and merchants from a data store.

Upon configuring the offer presentation, the process 44 proceeds through node "D" to FIG. 6, where the offer, as configured in the form of offer content, is received at another consumer user device (e.g., a device through which an email or text message is received) or account (e.g., one of the above-mentioned card-linked offer accounts, electronic wallet accounts, social networking accounts, or the like), as indicated by block 150. In some use cases, the "other" consumer user device is the same user device used at a later time to access one of the recipient accounts. Sometime after receipt, the other consumer user device or account may be used to present the offer at a point-of-sale terminal at a merchant's physical site (e.g., for in-store redemption), as indicated by block 152. Or in some cases, the other consumer user device is used to redeem the offer on-line, for example, using a URL linking to a webpage upon which the offer is presented, in which case, the process 44 returns to node "B" described above in FIG. 4 and proceeds with the current consumer user device.

In the case of in-store redemption, the offer information is received at a point-of-sale terminal that is part of the merchant system. Receiving the offer may include a sales clerk typing in an offer code (e.g., either as shown on a printout or displayed on a screen of a mobile user device presented by the consumer) or other identifier. Or receiving the offer may include scanning an optically-machine-readable code (e.g., scanning a bar code or QR code either on a printout or on a display screen of a mobile user device presented by the consumer). In some use cases, receiving the offer may include a wireless exchange between the point-of-sale terminal and a mobile user device (e.g., using near-field communication, infrared, Bluetooth™, or wireless area network connection to transfer data, such as an offer identifier and in some cases payment information, between a consumer's mobile device and the point-of-sale terminal). The transferred, scanned, or otherwise entered data may include an identifier (or identifiers) associated with the offer (and in some cases, the affiliate-network and/or the publisher) and, in some implementations, an identifier of the interaction record stored in step 128.

The merchant system may receive the offer information at a point-of-sale terminal, as indicated by block 154, and complete the in-store transaction, as indicated by block 156. Completing the transaction may include entering into the point-of-sale terminal identifiers of a plurality of different items or services (e.g., scanned stock-keeping-units (SKUs) from barcodes), retrieving from memory of the merchant system prices for those items, calculating a total price for the transaction, and applying the offer to the transaction, for example, calculating a discount for those items or services to which the offer applies. Merchant transaction records may also include identifiers of the consumer or a financial account used by the consumer, which some implementations may use to correlate the transaction with, and reward, activities by the affiliate-network, publishers, and/or consumers. (The reader should note that the use of "and/or" does not imply that other uses of "or" are necessarily used in the sense of an "exclusive or.") In some cases, publishers are compensated for the total amount of the purchase, even if the offer itself only applies to a subset of the goods or services that are purchased. Thus some embodiments associate the total amount purchased with the offer redemption. The merchant system may store a transaction record in memory that includes a listing of the items purchased, the affiliate-network, purchase amounts, a total purchased amount, and an identifier of the offer, the publisher, the session with which the user receive the offer, or a combination thereof.

The merchant system may send data describing the off-line, in-store transaction to the affiliate-network system, which may receive this data, as indicated by blocks 158 and 160. In some cases, some or all of the merchant transaction record is sent. Sending the data may include automatically executing a process on the merchant system that periodically uploads the merchant records through an API of the affiliate-network system, for example, nightly or hourly. Or some embodiments may upload the merchant records in real-time, for example within minutes of the transaction. In some implementations, an employee operating a user device within the merchant system may manually take action to send the transaction record, for example, in a batch of transaction records emailed daily to an administrator of the affiliate-network system. The records received from the merchant may be parsed by the affiliate-network system and used to populate corresponding interaction record in the tracking data store 42 described above.

Next, the affiliate-network system may associate the off-line transactions with publishers (e.g., based on the data from the merchant and/or data collected by the affiliate-network in connection with the transactions) and report the association to the publisher and the merchant, as indicated by blocks 162, 164, 166, and 168. Associating the off-line transactions with the publisher may include calculating an aggregate amount owed by a given merchant to a given publisher based on transactions associated with that publisher because of redemptions of offers identified to consumers by that publisher. Or, in another form of associating the transactions with the publisher, the affiliate-network may act as a financial intermediary, billing merchants, associating the off-line transaction with the publisher, and compensating publishers based on the transactions, such that the two groups need not interface with one another to transfer payment. For example, in some embodiments, the identifier discussed in paragraph 95 may only be unique to the affiliate-network (rather than each publisher) so that the merchant may associate the transaction with the affiliate-network. In such cases, the affiliate-network may associate the transaction with a publisher, or estimate the relative number of transactions that should be associated with a publisher based on data collected in connection with process 44. In some cases, records are maintained so that merchants and publishers can audit the affiliate-network system.

In some implementations, multiple parties are compensated for a transaction. For instance, merchants or the affiliate-network may define compensation models in merchant or offer records. The compensation models may specify an amount of compensation for each of several publishers who presented the offer to consumers (as indicated by the interaction records), as some transactions are caused by repeated exposure to offers. Some compensation models may divide a total reward equally among each publisher, or some may allocate more credit to the final publisher or to those publishers whose presentation of an offer precipitated a particularly desirable form of consumer interaction, such as printing the offer. In some cases, compensation is calculated for both consumers who shared an offer and publishers, e.g., calculating points in a loyalty reward program for the consumer and a cash reward for the publisher.

Thus, some embodiments of process 44 compensate publishers for both on-line and in-store redemptions, as well as redemptions that cross over onto other user devices or accounts (which generically may be referred to as "redemption channels"). As explained, some embodiments provide for relatively wide distribution of offers by merchants across multiple channels. Further, because some embodiments associate interaction records spanning multiple channels for redemption with a single offer identifier, merchants and publishers can track activity relating to offers across multiple channels and dynamically adjust their activities or content of the offer to enhance their performance, for example, up the ranking of or increase the number of channels or discount amount for offers that, in at least certain channels, are performing particularly well, or terminating or reducing the discount amount for offers that are spreading more quickly or being redeemed in greater number than a merchant would desire when measured against activity across all channels for redemption. (Though, again, not all embodiments necessarily provide these benefits.)

The above-described processes are explained with reference to a single offer and with reference to alternate branches for on-line and off-line redemption, but it should be understood that the steps of process 44 may be repeated thousands of times per hour for thousands of offers, in some cases, concurrently among thousands of offers, thousands of publishers, and thousands of merchants for millions of consumers. Moreover, in some use cases, affiliate-network systems become more useful as they acquire scale. Many merchants wish to have their offers distributed through many publishers, and many publishers wish to have access to a wide array of offers. To support the desired scale, some embodiments may perform the process 44 with implementations of the affiliate-network system 12 (FIG. 1) built with data centers that execute multiple instances of the above-describe modules to support relatively large numbers of concurrent operations.

Figure 7:
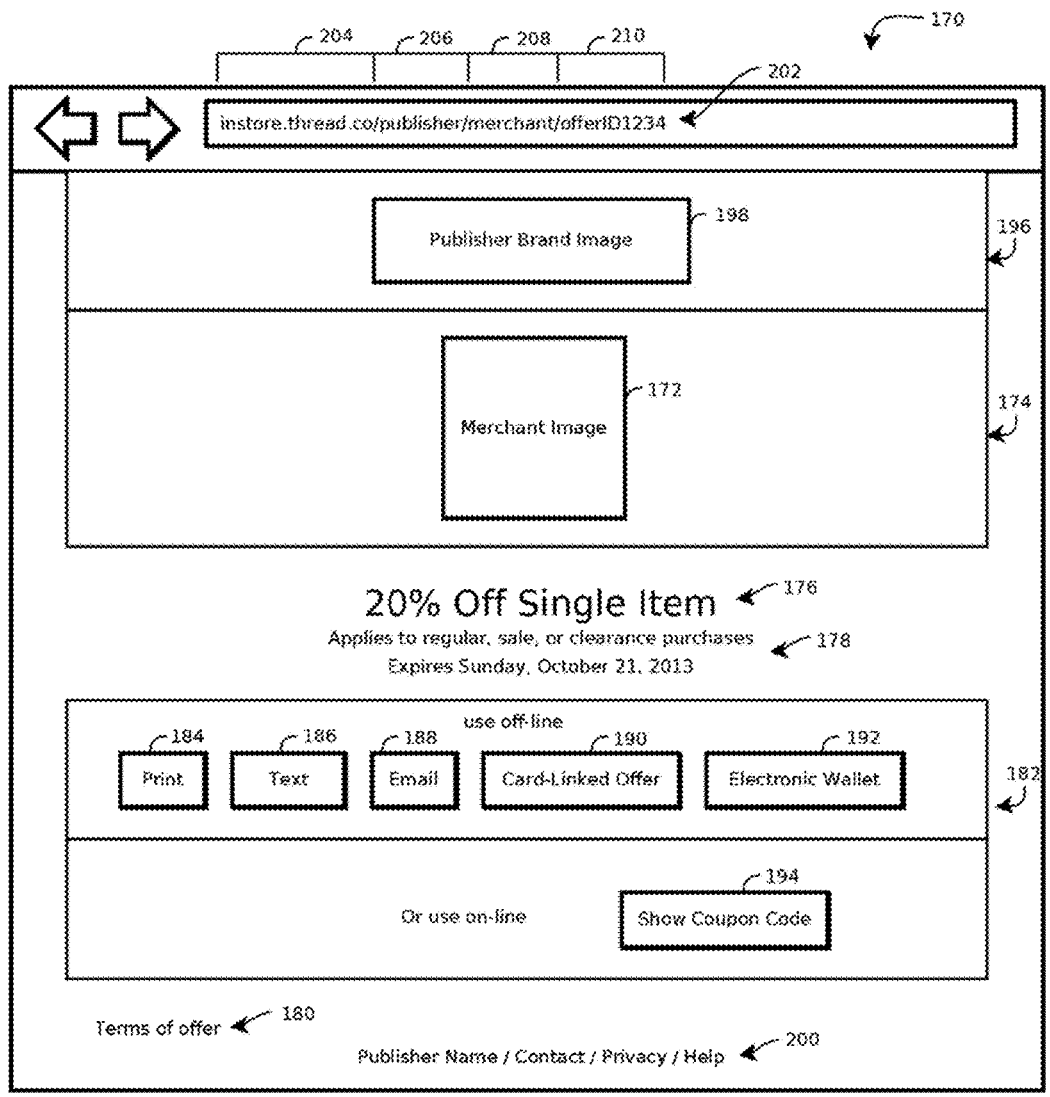
FIG. 7 shows an example of offer content that is dynamically configured for presentation on a user device having a relatively large display.

As described above, the offer presentation configuration process 80 and content negotiation module 30 configure offer content based on various parameters, such as those relating to the publisher and device or account through which the offer content will be accessed. To illustrate the resulting offer content, FIG. 7 shows an example of offer content 170 configured for display in a relatively large display screen, DOM element, or window. In some cases, the offer content 170 is web content presented within a web browser on a desktop computer, laptop computer, a tablet computer, or the like. The illustrated offer content 170, in this case, includes various merchant resources associated with an offer and a merchant, including a merchant logo image 172 and a merchant banner 174 (e.g., a div-box having a merchant selected color). The illustrated offer content 170 also includes various resources and content specific to the offer, including a description of the offer 176, a summary of the terms of the offer 178, and a link to a more comprehensive description of the terms of the offer 180.

The illustrated offer content 170 further includes user-selectable interfaces 182 applicable to the offer. In this example, the interfaces 182 include a print button 184, a text button 186, an email button 188, a card-linked offer button 190, and an electronic wallet button 192, which collectively constitute an exemplary set of off-line offer redemption interfaces. These interfaces may be used to facilitate redemption through another device (including a printer) or account. Further, the offer content 170 includes a button to show a coupon code 194 for on-line redemption. In some cases, a coupon code is concealed or otherwise withheld from view to force the user to interact with the offer content 170 to indicate interest in an offer before redemption. (Otherwise, a user may, for example, write down or memorize the offer code and manually enter that code in a merchant's checkout page, thereby preventing the publisher from being credited with the transaction, though some embodiments also display the code initially.) The offer content 170 may include scripts, such as JavaScript™, that execute upon a user selecting one of the buttons (e.g., in response to an on-click event or an on-touch event), and those scripts may initiate the above-described steps of process 44 that implement the requested functionality.

The offer content 170 may also include content specified by the publisher, including a banner 196 of a color selected by the publisher to match the publisher's branding and an image of the publisher's logo 198, along with text and links associated with the publisher's website (or corresponding API calls to a publisher's native application). Further, the URI 202 with which the offer content 170 was retrieved from the affiliate-network system 12 includes a domain of the affiliate-network system 204, the name of the publisher 206, the name of the merchant 208, and an identifier of the offer 210. In some cases, this URI is provided to consumer user devices, as described above, so that consumer interactions can be tracked across multiple channels by centralizing requests with the affiliate-network system 12. Further, including the publisher's named in the URI and including publisher content in the offer content 170 allows multiple publishers to maintain distinct brands, while using a centralized service to host offer content.

Figure 8:
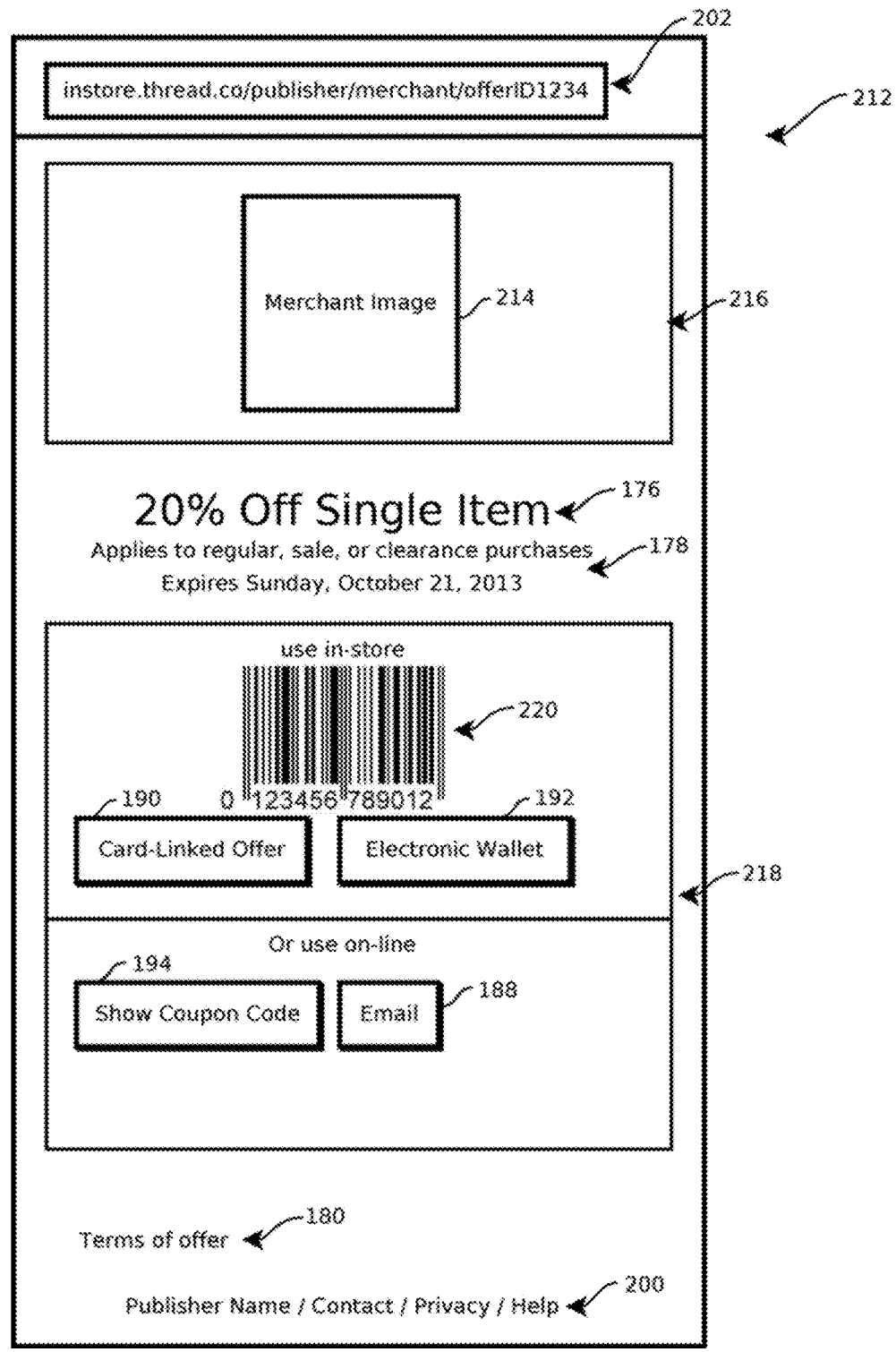
FIG. 8 shows an example of offer content that is dynamically configured for presentation on a mobile user device having a relatively small display.

FIG. 8 shows another example of offer content 212 configured for display on a relatively small display screen, DOM element, or window. In some cases, the offer content 212 is obtained with reference to the same URI 202 as the offer content 170 of FIG. 7. This example of offer content includes a merchant image 214 associated with the offer or the merchant, which may be a lower-resolution version of the image 172 (FIG. 7) to accommodate the smaller display area. The illustrated offer content 212 also includes a banner 216, which may be of a color selected by the merchant or the publisher, depending upon the implementation. The offer description 176 and summary of terms 178 is also used in the offer content 212, though some versions may store and display a shorter version of the description or terms for smaller displays. In this example, the offer content 212 includes a different set of offer interfaces 218, as specified by the above-mentioned templates and the offer record for the offer being displayed (e.g., some offers are only redeemable on-line). In this case, the interfaces include a card-linked offer button 190, and the electronic wallet button 192 to facilitate in-store usage of the offer by sending the offer to an account with which the consumer can pay for a transaction and apply the offer. Interfaces also include buttons 192 and 188 showing the offer code or emailing the offer, respectively. Further, this example includes an optically scannable image 220, in this case, a barcode image, though other types of such images may be used, including temporally changing patterns (e.g., codes transmitted by flashing a pattern on a display screen), or QR codes. As noted above, some embodiments may dynamically generate single-use offer codes, and the barcode image 220 may be dynamically generated, for example at the time the offer content 212 is requested. The offer content 212 also includes the publisher links and information 200.

The two versions of offer content 170 and 212 may both be retrieved using the same URI 202 and may be specified by different templates selected based on the type of consumer user device, account, or display window in which the offer will be displayed. Those templates may be populated, in part, with resources and other content provided by the publisher, such that the presentation is customized to be in accordance with the publisher's brand, and the offer content 170 and 212 generally may be selected in view of the size of display and likelihood that the display will be carried into a store to be presented at a point-of-sale terminal. Other forms of offer content may accommodate APIs specified for adding the offer to a card-linked offer account or an electronic wallet. Further, some versions may include templates for HTML formatted emails and text formatted emails.

Figure 9:
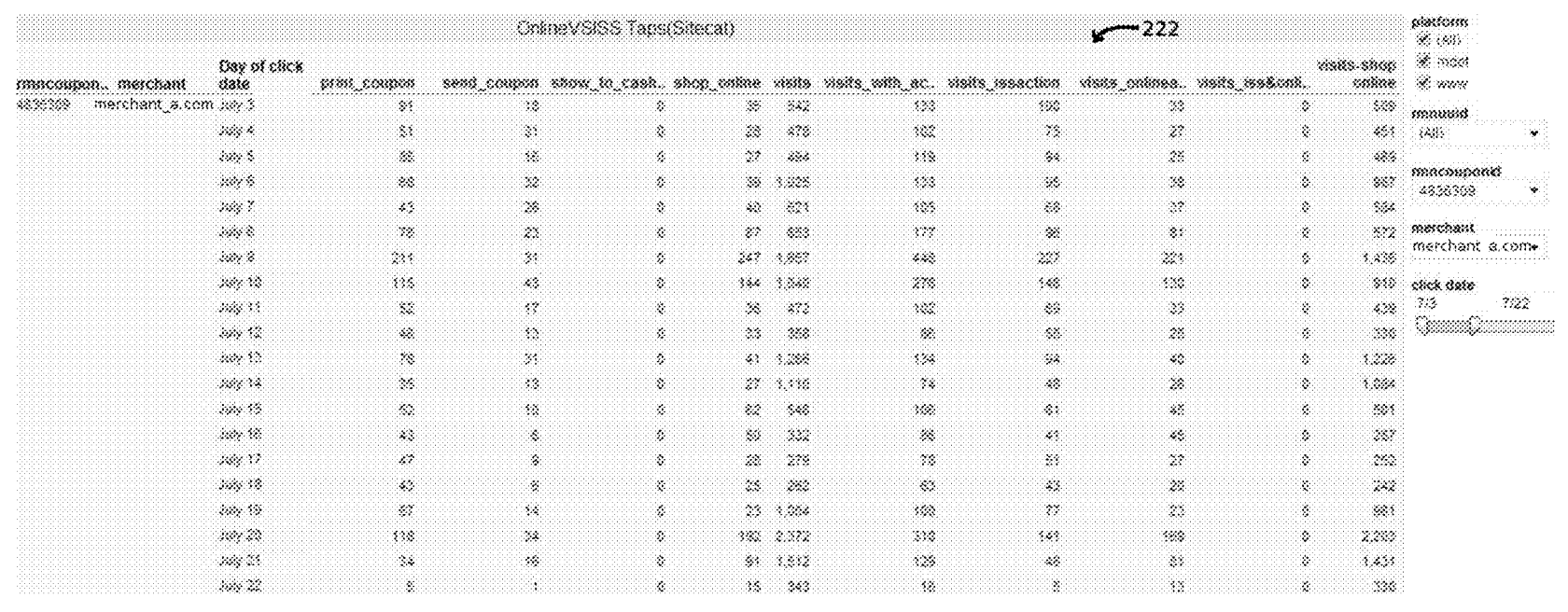
Figure 10A:
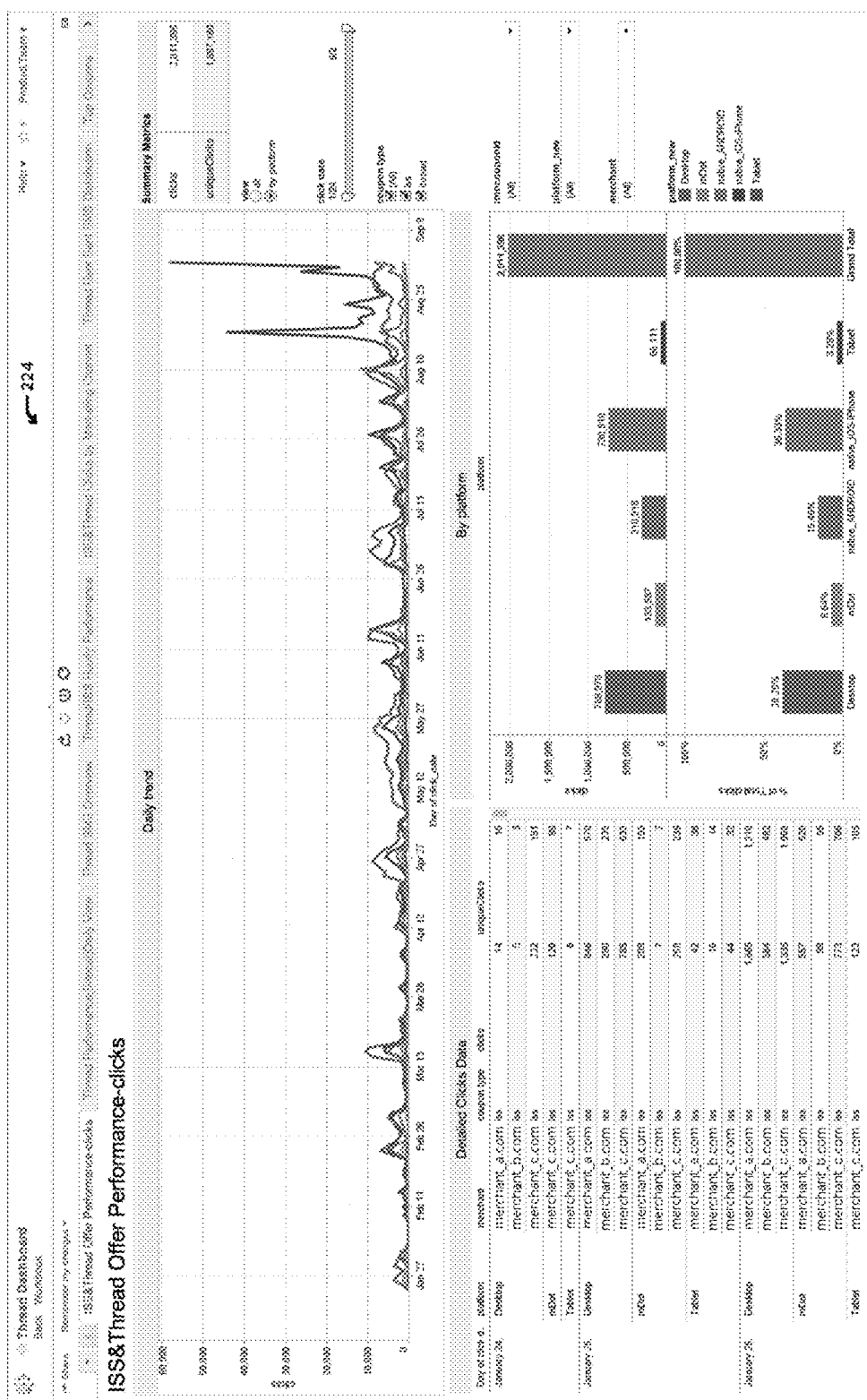
FIGS. 10A and 10B each show portions of an example of a publisher-analytics interface that presents data aggregated across multiple channels of offer interaction.
Figure 10B:
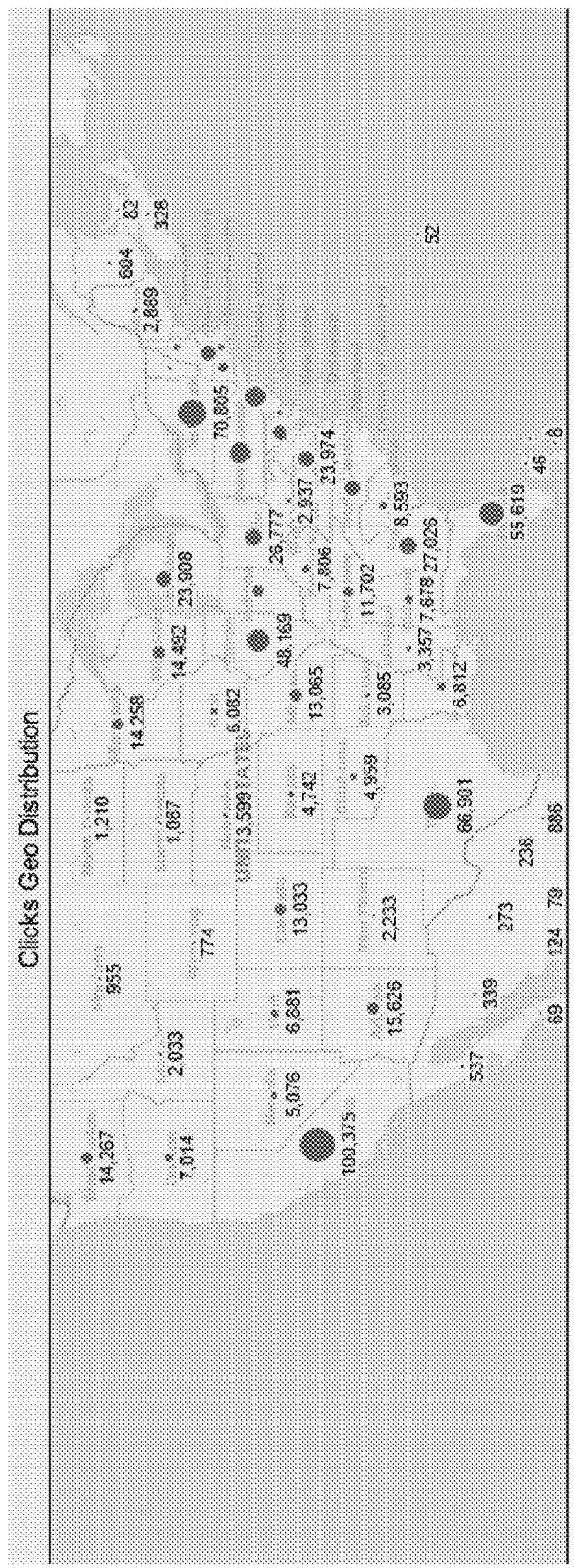

As noted above, centralizing tracking of interactions with offers across multiple channels allows merchants and publishers to track the performance of a given offer through multiple forms of redemption and other interactions. FIGS. 9 and 10 show examples of analytics generated based on the above-described interaction records. FIG. 9 shows a screenshot of merchant metrics 222 by which a merchant can view (e.g., via a web browser) and interact with various statistics associated with redemptions of (or other interactions with) offers across multiple channels. Similarly, FIGS. 10A and B show portions of a screenshot of publisher metrics 224 by which publishers can perform similar analyses. The screenshots 222 and 224 include various interfaces by which publishers and merchants can query data specific to offers, date ranges, merchants, publishers, consumer user device operating system, channel, geographic distribution, and the like. Using responsive data, merchants and publishers may adjust their strategies related to offers to improve their performance.

In some embodiments, the interaction records may be used to dynamically adjust the terms of offers with a process 226 based on consumer interactions both in-store and on-line. The process 226 may be performed by the above-described affiliate-network system 12 of FIG. 1, though embodiments are not limited to that implementation. In some cases, the process 226 is performed by a data processing apparatus executing code specifying steps of process 226 in a non-transitory, machine-readable, tangible medium, examples of which are described below with reference to a computer system of FIG. 17. Dynamically adjusting the terms of offers is expected to become more desirable as merchants issue increasing number of offers redeemable across multiple channels and being of increasing complexity, for example, varying in geographic applicability, having a shorter term, using A/B testing, and applying to narrower sets of conditions.

Adjusting the terms of offers can refer to a number of different activities that change the universe of offers presented to consumers. In some cases, dynamically adjusting the terms of an offer includes canceling the offer, for example, by ceasing to send the offer to publishers, or by sending a message to publishers to stop publishing an offer that has already been sent to them. In some cases, dynamically adjusting the terms of an offer includes automatically generating new offers based on an existing offer (e.g., changing one or two terms or attributes—including images and other resources—of an existing offer in a merchant-specified fashion), such that subsequent publisher requests retrieves the new, dynamically generated offer, and the previously presented offer is no longer published. Thus, consumers who, for example, printed an earlier iteration of an offer may have a print-out with a barcode that ties to the previous terms of the offer, prior to dynamic adjustment of the new terms, while a consumer who prints a new version of the offer after dynamic adjustment will receive a different barcode, tied to the dynamically adjust the terms. These terms may be sent to a merchant's system (e.g., via a merchant API) to update a merchant database for applying the offer in-store with the new terms.

Figure 11:
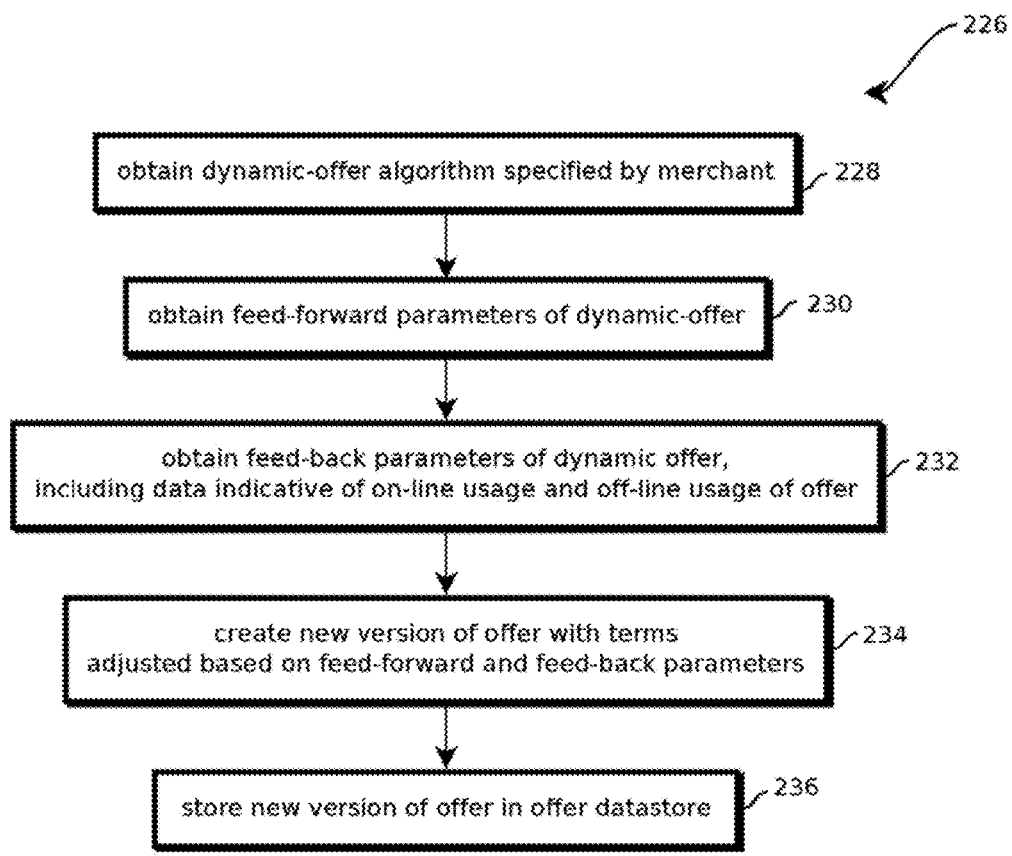
FIG. 11 shows an example of a process for dynamically adjusting the terms of multi-channel offers based on feedback from multiple channels of offer interaction.

Referring now to FIG. 11, the process 226, in this embodiment, begins with obtaining a dynamic-offer algorithm (or at least certain variables of a dynamic-offer algorithm) specified by a merchant, as indicated by block 228. In some cases, merchants specify this algorithm (or variables) by, for instance, entering threshold rates or amounts of particular types of consumer interactions with a given offer (or collection of offers) and indicating actions to be taken upon those thresholds being exceeded, for example, requesting an alert be sent to the merchant, requesting that the offer no longer be published, or requesting that a new offer with less or more generous terms be generated and published instead of the current offer. For instance, the algorithm may indicate that a given offer is to be replaced with a new offer with a 5% smaller discount or shorter expiration date in response to the amount of consumer interactions via social-network sharing exceeding a threshold of 50,000 such interactions. Or embodiments may specify that an offer related to winter coats is to be issued and valid in geographic areas in which the weather forecast calls for temperatures below 45-degrees Fahrenheit within the next 5 days.

The process 226, in some cases, further includes obtaining feed-forward parameters of the dynamic-offer, as indicated by block 230. Some merchants may wish to adjust the terms of offers based on data external to the affiliate-network systems. For example, a merchant may specify that an offer be initiated or terms of an offer be adjusted in response to a change in the weather (for instance, to offer a discount on rain gear when rain is expected), a particular result in a sporting event (for instance, to discount jerseys of a winning or losing football team), or based on an amount or rate of occurrence of some term in a data-feed indicative of on-line activity, like the occurrence of a term in search queries or social network data feeds, indicating that a particular brand or item has become popular (for instance, specifying a discount on a particular brand of shoes in response to that brand name occurring above a threshold rate within search queries on-line). Not all embodiments, however, obtain or use such feed-forward parameters, which is not to suggest that any other feature cannot also be omitted.

Some embodiments of process 226 further include obtaining feed-back parameters of the dynamic-offer, such parameters including data indicative of both on-line usage and off-line usage of the offer, as indicated by block 232. The feed-back parameters may include the above-mentioned interaction records, for example, a rate, an amount, or types of such interaction records. In one case, a merchant may specify that the terms of an offer are to be adjusted in response to more than a threshold amount of interactions indicating a consumer has sent the offer to more than one recipient to limit the spread of an offer that is particularly generous. In another example, merchants may request an alert when more than a threshold rate of interaction records are generated for a given offer, for example, more than five standard deviations of the typical rate of accumulation of offer interactions that occurs for that merchant. Such anomalous rates may be indicative of an error in the offer, for example, offering a price discount that is larger than what the merchant intended to offer, in which case, the merchant may wish to dynamically or manually adjust the terms of that offer.

The process 226, in some embodiments, further includes creating a new version of the offer with terms adjusted based on the feed-forward and the feed-back parameters, as indicated by block 234. As noted above, this step may include canceling an offer, sending a message to publishers requesting that they cease publishing an offer, and creating a new offer with different terms, for example, with a 5% smaller discount, a 5% larger discount, a five dollars smaller discount, a five dollar larger discount, a shorter expiration date, or a longer expiration date. Further, as noted above, some merchants may specify that an alert is to be sent to the merchant, so the merchant can manually intervene.

The process 226 may further include storing the new version of the offer in an offer data store, as indicated by block 236. Storing the new version of the offer may include creating a new offer record in the above-described data store 40 of FIG. 1, for example by cloning the existing record upon which the feed-back is based and adjusting the terms in the new record based on the instructions provided by the merchant in the dynamic-offer algorithm. Alternatively, storing the new version of the offer may include changing a record of an existing offer to indicate that the offer is to no longer be published.

Thus, some embodiments of the process 226 allow merchants to automate the management of offers and respond relatively quickly to changes in interactions with offers and to changes in likely demand for offers, across multiple channels of offer redemption. Further, some merchants may use the automation process to A/B test offers, issuing offers with low-thresholds before cancellation, and measuring the response of consumers to differences between offers, refining offer terms and offer content to increase efficacy. The process 226 can be used with the above-described affiliate-network system 12 and process 44, which are suited to producing feed-back data by which offers may be relatively reliably automatically changed, but the process 226 is not limited to those implementations and is independently useful in other environments.

In some embodiments, a merchant may desire to limit an offer to a single redemption per user (referred to as a "single-use offer"). Thus, a merchant may desire to limit an offer by the number of uses within, or as an alternative to, a time period. In such embodiments, each offer may be associated with a finite number of offer codes that are no longer redeemable after use. Such offer codes may be referred to as "single-use codes" or "single-use offer codes." The distribution and association of each single-use offer code with a user may be performed according to various techniques described herein. In various embodiments, a single-use offer code may be distributed and associated with a user session, a phone number of a consumer user device (e.g., a smartphone), or a consumer user device identifier. In some embodiments, a merchant may use a single-use offer and single-use offer codes for improved tracking of distribution and redemption of offers. For example, the distribution and subsequent evaluation of redeemed single-use offer codes may enable improved determinations of offer redemption rates and other metrics.

Figure 12:
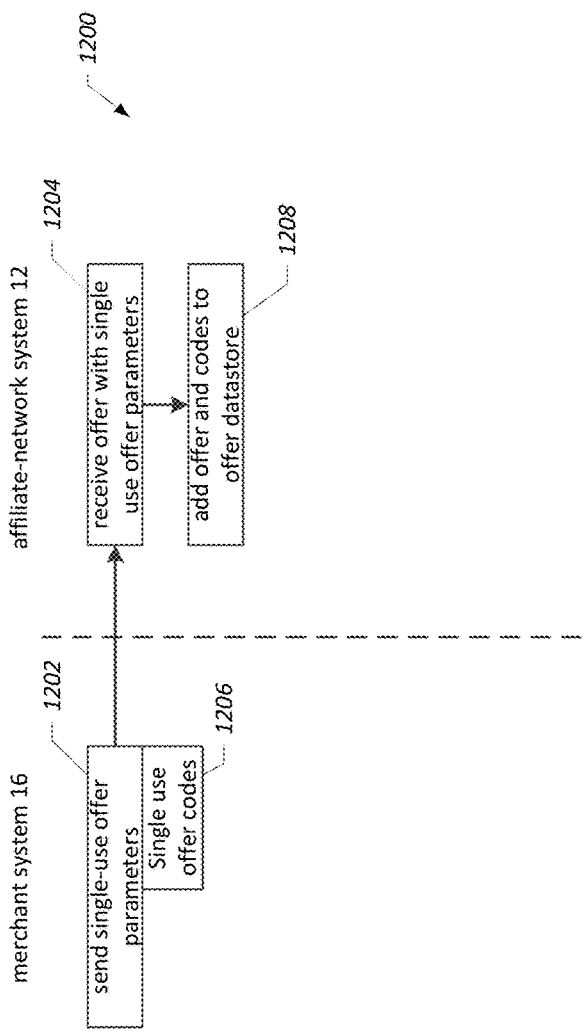
FIG. 12 shows an example of a process for providing single-use offer codes to an affiliate-network system.

As mentioned above, in some embodiments the offer data store 40 is configured to store data about offers provided by merchants that use the affiliate-network system 12. FIG. 12 depicts a process 1200 for providing single-use offer codes to the affiliate network system 12 in accordance with an embodiment of the present invention. As is illustrated in FIGS. 2-6, a first column of the flow chart of FIG. 12 corresponds to the merchant system 16 and a second column of the flow chart of FIG. 12 corresponds to the affiliate-network system 12.

As mentioned above in FIG. 2, the merchant system 16 may send offer parameters to the affiliate-network system 12, as indicated by blocks 1202 and 1204. For a single-use offer, the offer parameters may include a list of single-use codes 1206 for an offer. In some embodiments, a merchant may define a particular symbology for the single-use offer codes. For example, in some embodiments the merchant system 12 may provide code 39 barcodes, alphanumeric codes, or other suitable codes. In other embodiments, the merchant system 16 may send general single-use code symbology parameters to the affiliate-network system 12, and the affiliate-network system 12 may generate the codes. In some embodiments, the merchant system 16 or the affiliate-network system 12 may have a maximum limit on the number of single-use offer codes for an offer.

As mentioned above, in some embodiments the offer parameters are provided through a website interface hosted by the affiliate-network system 12. This website may include interfaces by which a merchant can submit, modify, and remove single-use offer codes (or an administrator of the affiliate-network system may enter those single-use offer codes on behalf of the merchant).

After the offer is received at the affiliate-network, the offer is added to an offer data store of the affiliate-network system 12, as indicated by block 1208. In addition to the offer parameters described above, a single-use indicator may be stored to indicate whether an offer is associated with single-use codes. Additionally, the single-use codes may be stored in the offer data store or, alternatively, a link or reference to another data store having the single-use offer codes may be stored.

The steps illustrated in FIG. 12 and described above may be performed in submission of a new single-use offer, modification of an existing single-use offer, or removal of an existing single-use offer. In some embodiments, the merchant system 16 may send additional single-use offer codes for an existing offer. For example, after reviewing the performance of a single-use offer, a merchant may desire to increase the number of single-use offer codes so that more users are able to redeem the offer (e.g., due to faster than expected redemption of the initial number of single-use offer codes). In some embodiments, the performance of a single-use offer may be determined from the number of single-use offer codes distributed vs. the number of single-use offer codes redeemed. For example, as discussed below, online and offline merchant transaction data may include redemptions and the associated single-use offer codes. In some embodiments, the merchant system 16 may send a single-use offer codes to be removed from a single-user offer. For example, after reviewing performance of a single-use offer, a merchant may desire to prevent any further redemptions of the offer (e.g., due to negative performance of a single-use offer). In such instances, the list of single-use offer codes at the affiliate-network system 12 may be removed or voided based on the request received from the merchant system 16. In some embodiments, the merchant system 16 may send a request to remove a single-use offer and all single-use offer codes associated with the offer.

In some embodiments, the distribution and use of single-use offer codes are associated with user sessions, as mentioned above in paragraph 43. In such embodiments, a single-use offer code of an offer requested by a user is associated with the user session, such that no additional single-use offer codes are distributed in response to requests having the same user session. In such embodiments, the requested single-use offer code may be sent to a consumer user device and the association between the sent single-use offer code and the user session may be stored by the affiliate-network system 12, such as for the duration of the user session or longer.

Figure 13A:
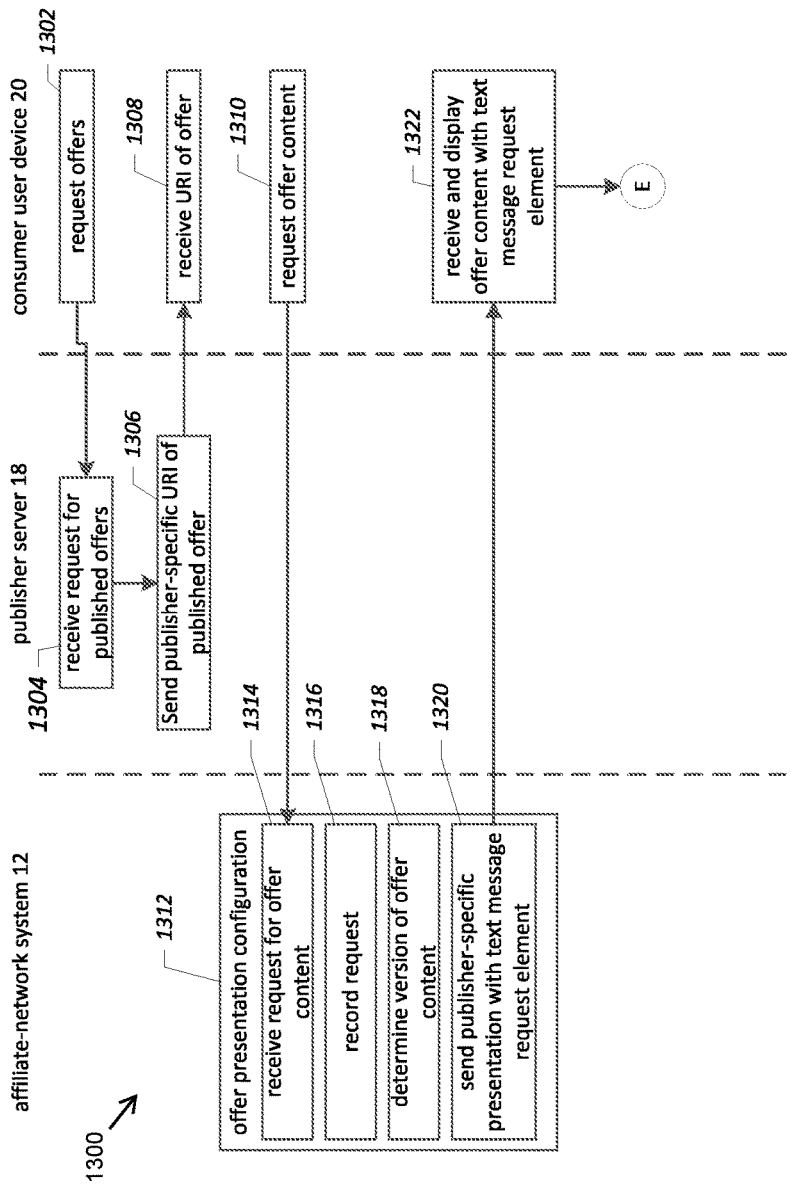
FIGS. 13A and 13B shows an example of a process for distributing and using single-use offer codes.
Figure 13B:
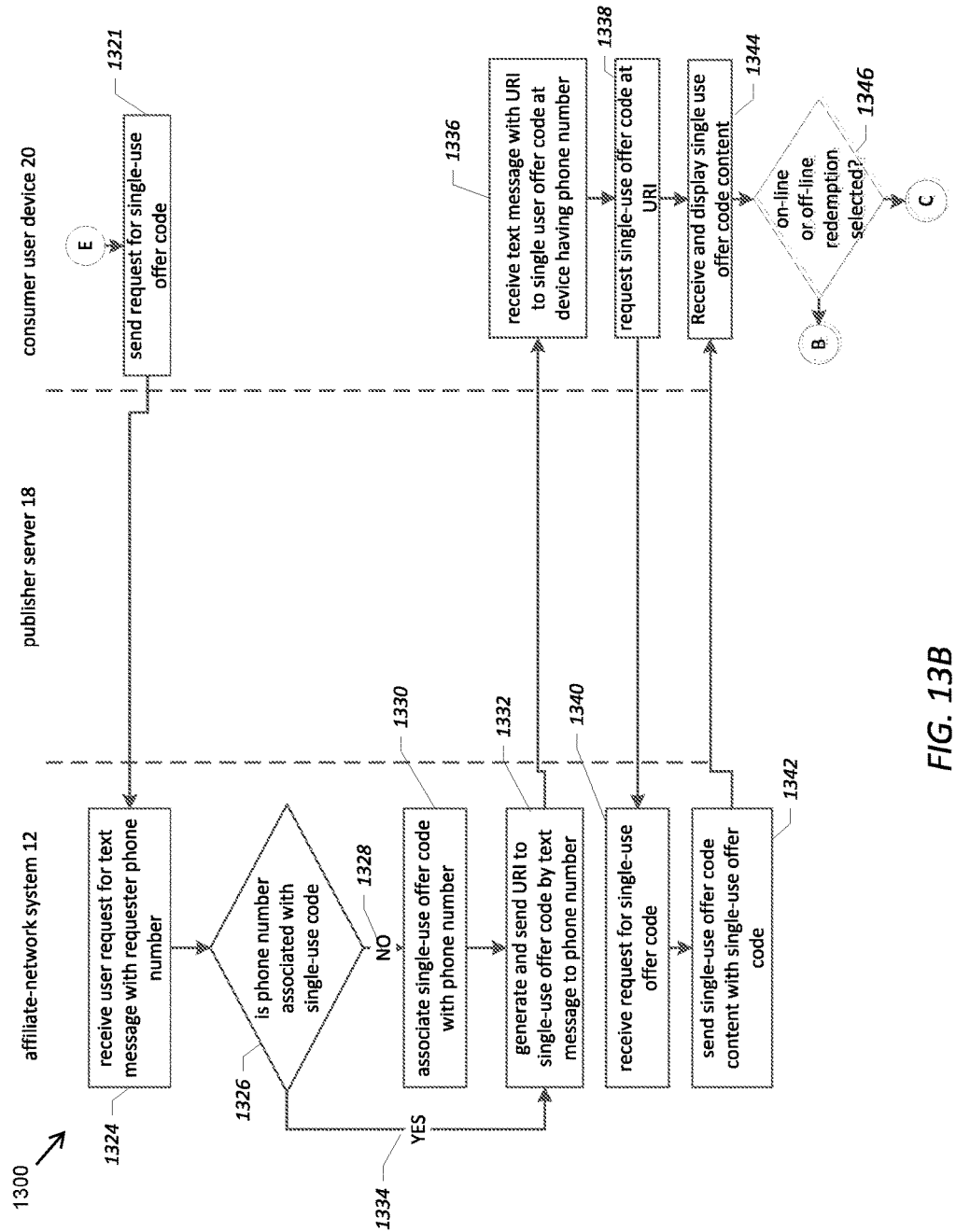

In some embodiments, the distribution and use of single-use offer codes are associated with phone numbers, and the single-use offer codes may be distributed via text messages to the phone numbers. FIGS. 13A and 13B are flow charts that depict a process 1300 for, in some embodiments, the distribution and use of single-user offers associated with phone numbers by the publisher server 18 and the consumer user device 20. As described above and similar to the flow charts illustrated in FIGS. 2-6, a first column of the flow chart corresponds to the affiliate-network system 12, a second column of the flow chart corresponds to the publisher server 18, and a third column of the flow chart corresponds to the consumer user device 20.

As shown in FIG. 13A, the process 1300 includes, in some embodiments, receiving at the publisher server 18 a request for published offers from the consumer user device

20, as indicated by blocks 1302 and 1304. In some embodiments, the request for offers 1302 may include a location, such as the location of the consumer user device 20, and offers may be provided to the consumer user device 20 based on the location. It should be appreciated that although the process 1300 is illustrated as being initiated by a request for offers from a consumer offer user device, in some embodiments various steps of the process 1300 may be initiated in response to a "push" for offers to the consumer user device 20 without an explicit request from the consumer user device 20 (although, in some embodiments, the user may not receive pushed offers until opting-in to such functionality).

The publisher server 18 may send the URIs of the matching published offers (e.g., publisher-and-offer-specific URI) to the consumer user device 20, which may receive the offers for publication (e.g., a publisher-and-offer-specific URI), as indicated by blocks 1306 and 1308. In some embodiments, the URI sent to the consumer device may include offer location data that may be used to display the offer based on location. In some embodiments, as mentioned above in paragraph 75, instructions to display information about the offers to the consumer are also sent to the consumer user device 20. In other embodiments, as described above in paragraph 76, the publisher may send instructions to the consumer user device 20 to retrieve information identified by the URIs without further interaction by the user (or this instruction may be provided by a native application executing on the consumer user device 20).

The consumer user device 20, in some embodiments, requests offer content identified by the URIs from the affiliate-network system 12, as indicated by block 1310. As described above in paragraphs 70-74, in some embodiments the request for offer content at the affiliate-network system initiates the offer presentation configuration process 1312. The offer presentation configuration process may be similar to the various steps 76, 78, 81, and 82 described above and illustrated in FIG. 3. As shown in FIG. 13A, the request for offer content may be received by the affiliate-network system 12, as indicated by block 1314. As mentioned above, in some embodiments, the request for offer content itself constitutes one type of interaction tracked in one of the above-mentioned interaction records in the tracking data store 42 of FIG. 1. In some embodiments, the offer presentation configuration process includes a step of recording the request in a tracking data store, as indicated by block 1316, and recording the request may include populating some or all of the above-mention fields in an interaction record as described above. In certain embodiments, this information may be used to compensate publishers.

In some embodiments, the offer presentation configuration process 80 includes determining a version of the offer content to send based on a consumer user device attributes, as indicated by block 1318. As mentioned above, examples of dynamically customized offer presentations are described above and illustrated in FIGS. 7 and 8. A publisher-specific presentation of the offer that includes a text message request element is sent to the consumer user device 20, as indicated by block 1320. As described further below, the text message request element enables a user of the consumer user device 20 to enter a phone number to request a text message with a single-use offer code. In response, a text message with a single-use offer code is sent to the phone number.

The consumer user device 20 may receive and display the customized offer content, as indicated by block 1322. The display of the offer content on the consumer user device 20 may be responsive to instructions received from the publisher server or instructions retrieved via identification information in the URI. As mentioned above, the offer content may be displayed in a web browser or a special-purpose native application, depending upon the use case, and some embodiments of the affiliate-network system provide offer content for both types of use cases. In some embodiments, the offer content specifies user interfaces for further interacting with the offer content, such as buttons, gestures, text inputs, voice inputs, or the like, for the consumer to express an intent to take further action with respect to a specific offer. Accordingly, the text message request element may be displayed using one of these user interfaces, such as a button and a field (e.g., a text field) for entering a phone number. The offer content may include instructions describing how to obtain a single-use offer code via text message and direct the user to the appropriate user interfaces.

The consumer user device 20 may send a request for a text message enabling access to the single-use offer code, as indicated by block 1321. The request is received by the affiliate-network system 12, as indicated by block 1324, and further processed. Such processing may include determining whether the phone number in the request has already received a single-use offer code. In some embodiments, the received phone number is represented by a unique code or other representation, such as a hash of the phone number and, in some embodiments, additional information. After the phone number is used as the recipient of a text message to the single-use offer code, the phone number may be deleted such that the number is not stored by the affiliate-network system 12. The unique code may be used in subsequent processing (e.g., for determining whether a single-use offer code is associated with a phone number).

As shown in FIG. 13B, the affiliate-network system 12 may determine whether the phone number in the request is associated with single-use offer code of the offer (e.g., as a result of a previous request for a text message having a link to the single-use offer code sent to the phone number), as indicated by decision block 1326. In some embodiments, a unique representation of the phone number may be stored with a single-use offer code indicator that indicates whether the phone number has previously been associated with a single-use offer code of the offer. In some embodiments, the indicator may be or include the single-use offer code previously sent to the phone number via text message.

If the phone number has not been associated with a single-use offer code (line 1328), a single-use offer code is associated with the phone number, as indicated by block 1330. Here again, the association may be stored, such as by storing an indicator and a unique representation of the phone number in the offer data store. A URI (e.g., a URL unique to the requestor phone number and associated offer code) that enables access to the associated single-use offer code is then generated and sent via text message to the requestor phone number, as indicated by block 1332. For example, in some embodiments, a URL may be generated that includes the requestor phone number or parameters unique to the requestor phone number. If the phone has previously been associated with a single-use offer code (line 1334), a URI that enables access to the previously sent single-use offer code may be resent via text message to the requestor phone number (block 1332). The text message may be sent using any suitable text messaging service, such as a text messaging service that is a component of a mobile communication network. In some embodiments, the text messaging service may be the Short Message Service (SMS).

In some embodiments, the URI may differ depending on whether the requestor phone number was already associated with a single-use offer code, whether all single-use offer codes are distributed, whether the single-use offer is still valid and so on. For example, if the requestor phone number has already been associated with a single-use offer code, the URI in the text message may direct to a webpage or other content that indicates a single-use offer code has already been distributed to the requestor phone number. Additionally, in some embodiments, the URI to the single-use offer code may expire after a period of time, such that a single-use offer code is no longer retrievable at the URI. In some embodiments, the URI to the single-use offer code may redirect to a different webpage or other content after all single-use offer codes are distributed (e.g., such that a user who attempts to access the content at the URI is presented with content that indicates the single-use offer is expired).

Next, the text message with the URI to the single-use offer code is received at the device having the requestor phone number, as indicated by block 1336. In some embodiments, as shown in FIG. 13B, the consumer user device requesting the single-use offer code and the consumer user device receiving the text message having the single-use offer code may be the same device, e.g., consumer user device 20. For example, if the consumer user device 20 is a smartphone capable of receiving text messages at a phone number, such a consumer user device may both request and receive the single-use offer code. In other embodiments, the consumer user device requesting the single-use offer code and the consumer user device receiving the text message having the single-use offer code may be different devices. For example, a user may use the consumer user device 20, e.g., a laptop computer, to request the text message having the single-use offer code, and the user may receive the text message having the single-use offer code at a second consumer user device, e.g., a smartphone.

After receiving the URI to the single-use offer code, the consumer user device receiving the text message may request the single-use offer code at the URI, as indicated by block 1338. The affiliate-network system 12 may receive the request for the single-use offer code, as indicated by block 1340. In response, the affiliate-network system 12 may send single-use offer code content having the single-use offer code to requesting consumer user device, e.g., consumer user device 20, as indicated by block 1342. The single-use offer code content may be similar to the previously described offer content but may include the single-use offer code associated with the phone number of the requesting consumer user device.

The requesting consumer user device, e.g., consumer user device 20, may receive and display the single-use offer code content having the single-use offer code, as indicated by block 1344. After receiving the single-use offer code content, the user may choose to redeem the single-use offer code. Depending on the type of the offer, different paths for on-line or off-line redemption may be followed, as indicated by decision block 1346. In such embodiments, if on-line redemption is selected the process processed to the node labeled "B" as described above and depicted in FIG. 4; if off line redemption is selected, the process proceeds to the node "labeled" C as described above and illustrated in FIG. 5.

Figure 14:
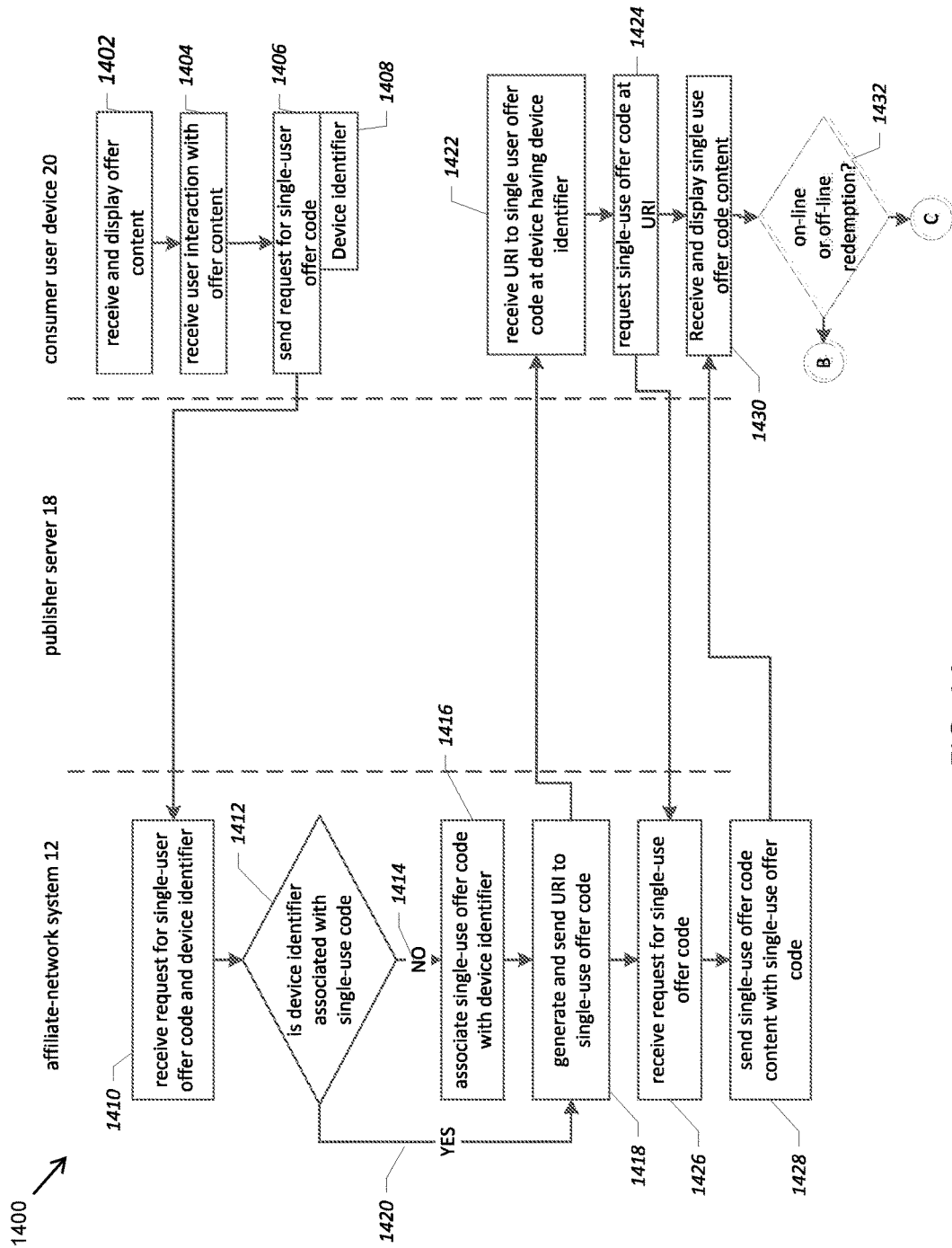
FIG. 14 shows another example of a process for distributing and using single-use offer codes.

In some embodiments, distribution and use of single-use offer codes may be associated with device identifiers unique to each consumer user device. FIG. 14 is a flow chart that depicts a process 1400 for, in some embodiments, the use of single-user offers by the publisher server 18 and the consumer user device 20. As described above and similar to the flow charts illustrated in FIGS. 2-6, a first column of the flow chart corresponds to the affiliate-network system 12, a second column of the flow chart corresponds to the publisher server 18, and a third column of the flow chart corresponds to the consumer user device 20.

As described above and as illustrated in FIG. 3, offers, such as single-use offers may be requested by and provided to the consumer user device 20. It should be appreciated that although in some embodiments may be "pushed" to the consumer user device 20 without an explicit request from the consumer user device 20 (although, in some embodiments, the user may not receive pushed offers until opting-in to such functionality). As also described above, the consumer user device 20 receives and displays customized offer content, as indicated by block 1402. Here again, the display of the offer content on the computer-implemented geographic may be responsive to instructions received from the publisher server or instructions retrieved via identification information in the URI, and the offer content may be displayed in a web browser or a special-purpose native application and some embodiments of the affiliate-network system provide offer content for both types of use cases. Additionally, the offer content may include buttons, gestures, text inputs, voice inputs, or other user interfaces, for the consumer to express an intent to take further action with respect to a specific offer. In some embodiments, the offer-content for a single-use offer may include instructions describing how to obtain a single-use offer code and a suitable user interface to enable a user to obtain a single-use offer code. For example, the offer content may include a button, a link, or other element that, upon selection by a user, initiates the sending of a request for a single-use offer code to the affiliate-network system 12.

As indicated by block 1404, user interaction with the offer content at the consumer user device may be received. In some instances, the consumer user device executes an event handler that launches various routines depending upon a user's input, and those routines may initiate the requested actions. In some embodiments, the user interaction with the offer content may include selection of a user interface, such as a button, link, etc., for obtaining a single-use offer code. For example, text of the offer content may indicate to the user that user redemption of an offer may require the user to obtain a single-use offer code using an indicated user interface provided with the offer content. In some embodiments, a request for a single-use offer code may be sent to the affiliate-network system, as indicated by block 1406. As mentioned above, the single-use offer code may be associated with a device identifier of the consumer user device. In some embodiments, a device identifier 1408 is provided with the request sent to the affiliate-network system. In some embodiment, the device identifier 1408 may be generated using an API provided by the manufacture of the consumer user device 20 or the operating system executed thereon. In some embodiments, the device identifier 1408 may be a unique device identifier (UDID), a universally unique identifier (UUID) or other suitable identifier. Additionally, in some embodiments, the device identifier 1408 is included in an encrypted header of the request sent to the affiliate-network system 12.

The request for a single-use offer code sent by the consumer user device 20 is received by the affiliate-network system 12, as indicated by block 1410, and further processed. Such processing may include determining whether the device identifier in the request has already received a single-use offer code. In some embodiments, the device identifier is represented by a unique code, such as a hash of the device identifier. In some embodiments, the device identifier may be deleted after use such that the device identifier is not stored by the affiliate-network system 12. The unique code may be used in subsequent processing (e.g., for determining whether a single-use code is associated with a device identifier).

As shown in FIG. 14, the affiliate-network system 12 may determine whether the device identifier in the request is associated with single-use offer code of the offer (e.g., as a result of a previous request for a single-use offer code sent to the consumer user device 20), as indicated by decision block 1412. In some embodiments, a unique representation of the device identifier may be stored with a single-use offer code indicator that indicates whether the consumer user device 20 has previously been associated with a single-use offer code of the offer. In some embodiments, the indicator may be or include the single-use offer code previously sent to the consumer user device 20.

If the device identifier has not been associated with a single-use offer code (line 1414), a single-use offer code is assigned to the device identifier, as indicated by block 1416. Here again, the association may be stored, such as by storing an indicator and a unique representation of the device identifier in the offer data store. A URI that enables access to the associated single-use offer code is then generated and sent to the consumer user device 20, as indicated by block 1418. If the device has previously been associated with a single-use offer code (line 1420), a URI that enables access to the previously sent single-use offer code may be resent to the consumer user device 20 (block 1418).

In some embodiments, the URI may differ depending on whether the requestor device identifier was already associated with a single-use offer code, whether all single-use offer codes are distributed, whether the single-use offer is still valid and so on. As described above in paragraph 137, the URI may change or redirect to different webpages or other content after period of time, after all single-use offer codes have been distributed, and so on.

In other embodiments, instead of a URI that enables access to a single-use offer code, the single-use offer code may be sent directly to the consumer user device 20. For example, in some embodiments the single-use offer code may be sent to the consumer user device 20 as additional offer content. For example, the single-use offer code may be asynchronously provided to the consumer user device 20 such that a portion of the offer content is updated with the single-use offer code without resending all of the offer content for the offer.

After receiving the URI to the single-use offer code, the consumer user device may request the single-use offer code at the URI, as indicated by block 1424. As discussed above, the affiliate-network system 12 may receive the request for the single-use offer code, as indicated by block 1426. In response, the affiliate-network system 12 may send single-use offer code content having the single-use offer code to the consumer user device 20, as indicated by block 1428. The single-use offer code content may be similar to the previously described offer content but may include the single-use offer code associated with the device identifier of the requesting consumer user device.

The consumer user device 20 may receive and display the single-use offer code content having the single-use offer code, as indicated by block 1430. As noted above, in other embodiments, the single-use offer code may be sent directly to the consumer user device 20 and displayed with the offer content described above. After receiving the single-use offer code, the user may choose to redeem the offer. As mentioned above, depending on the type of the offer, different paths for on-line or off-line redemption may be followed, as indicated by decision block 1432. In such embodiments, if on-line redemption is selected the process processed to the node labeled "B" as described above and depicted in FIG. 4; if off line redemption is selected, the process proceeds to the node "labeled" C as described above and illustrated in FIG. 5.

In other embodiments, the distribution and use of single-use offer codes described above in FIGS. 13A and 13B or FIG. 14 may be based on other factors, such as the location of the consumer user device 20, a specific time, a specific date, and other factors or combination thereof. In some embodiments the expiration time of a URI to a single-use offer code may be reduced to promote faster redemption based on the location of the consumer user device 20. For example, if the consumer user device 20 enters a specific location (e.g., a geographic area such as a shopping mall that corresponds to a predefined geofence), a requested single-use offer code and associated URI may only be accessible for a relatively short time to encourage redemption while a user is at the shopping mall. In another example, the expiration time of a URI to a single-use offer code may be reduced to promote faster redemption based on the date (e.g., to promote redemptions on a historically active shopping day such as Black Friday). In other embodiments, a single-use offer code may be pushed to a consumer user device based on a specific location, specific time, specific date, or other factors or combination thereof. For example, in some embodiments of a URI to a single-use offer code may be pushed to a consumer user device 20 if the user is located in a merchant location specific to or capable of redeeming a single-use offer, the URI to the single-use offer code (or the single-use offer code itself) may be pushed to the consumer user device 20.

Figure 15:
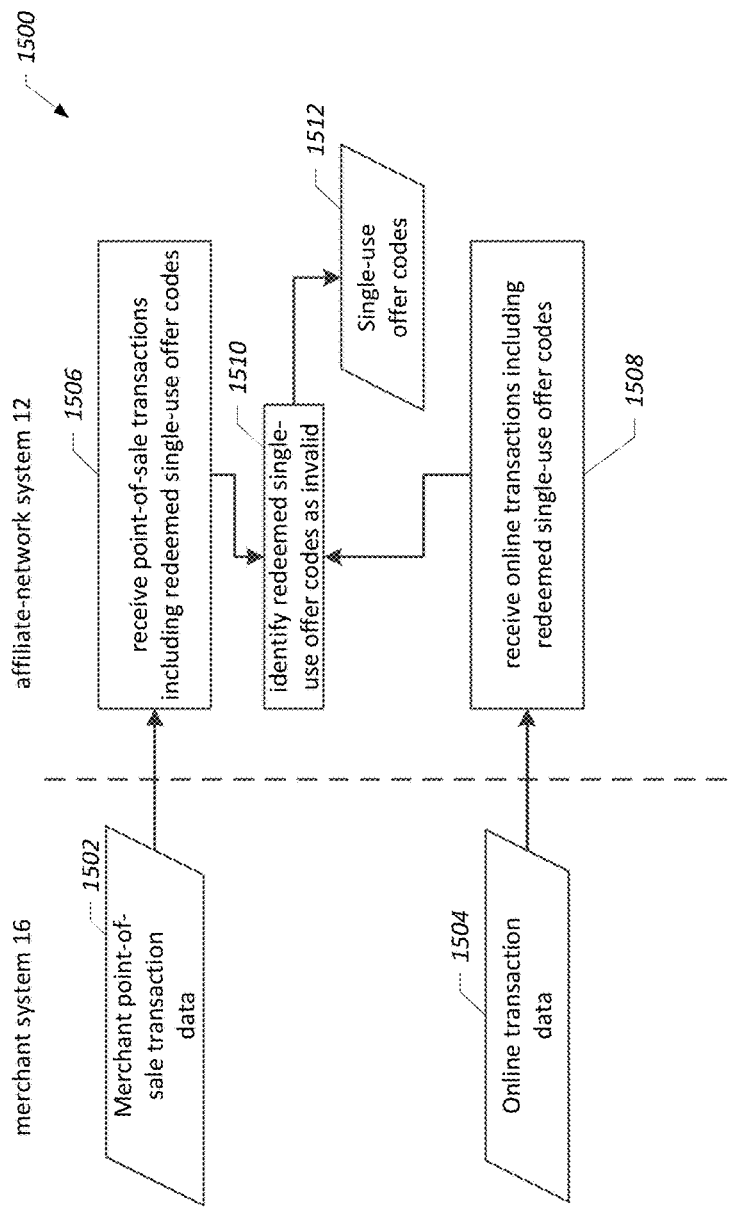
FIG. 15 shows an example of a process for updating single-use offer codes based on redemptions at a merchant.

FIG. 15 is a flow chart that depicts a process 1500 for, in some embodiments, updating single-use offer codes based on redemptions at a merchant. As discussed above and as illustrated in FIGS. 4-6, offers may be redeemed off-line and on-line. User may redeem single-use offer codes at merchant point-of-sales during sale transactions, generating off-line transaction data, as indicated by block 1502. Similarly, as described above and as illustrated in FIG. 4, single-use offer codes may be redeemed online, generating online transaction data, as indicated by block 1504.

The off-line transaction data may be received and may include the redeemed single-use offer codes, as indicated by block 1506. In some embodiments, for example, the merchant system 16 may periodically send point-of-sale transaction data to the affiliate network system 12. For example, after a period of time, a number of transactions, or other period the merchant system 16 may send the point-of-sale transaction data 1502 to the affiliate-network system 12. Additionally, the affiliate-network system 12 may receive the online transaction data 1504, as indicated by block 1508. In some embodiments, as noted above, the affiliate-network system 12 may obtain online transaction data at the time of the transaction, such as via the checkout page of the merchant system 16.

After receiving redeemed single-use offer codes from the offline transaction data 1502 and the online transaction data 1504, the redeemed single-use offer codes may be identified as invalid (e.g., voided), as indicated by block 1510. In some embodiments, the redeemed single-use offer codes may be removed from a list of single-use offer codes 1512 for an offer. In other embodiments, the redeemed single-use offer codes may be flagged or otherwise identified on the list of single-use offer codes 1512, such that the redeemed single-use offer codes are no longer distributed upon request from a consumer user device 20.

Figure 16A:
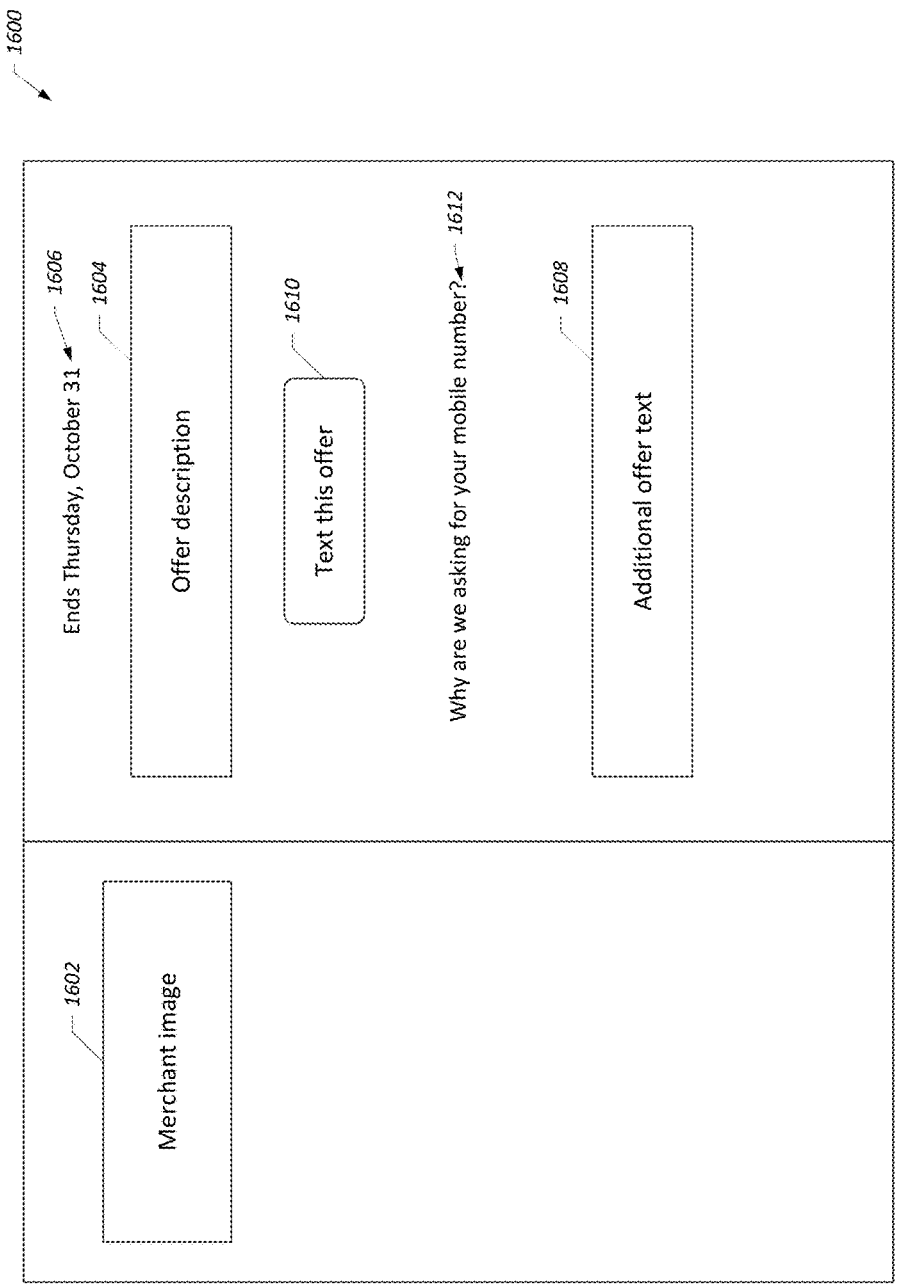
FIGS. 16A and 16B shows an example of offer content having a user interface for obtaining a single-use offer code via text message.
Figure 16B:
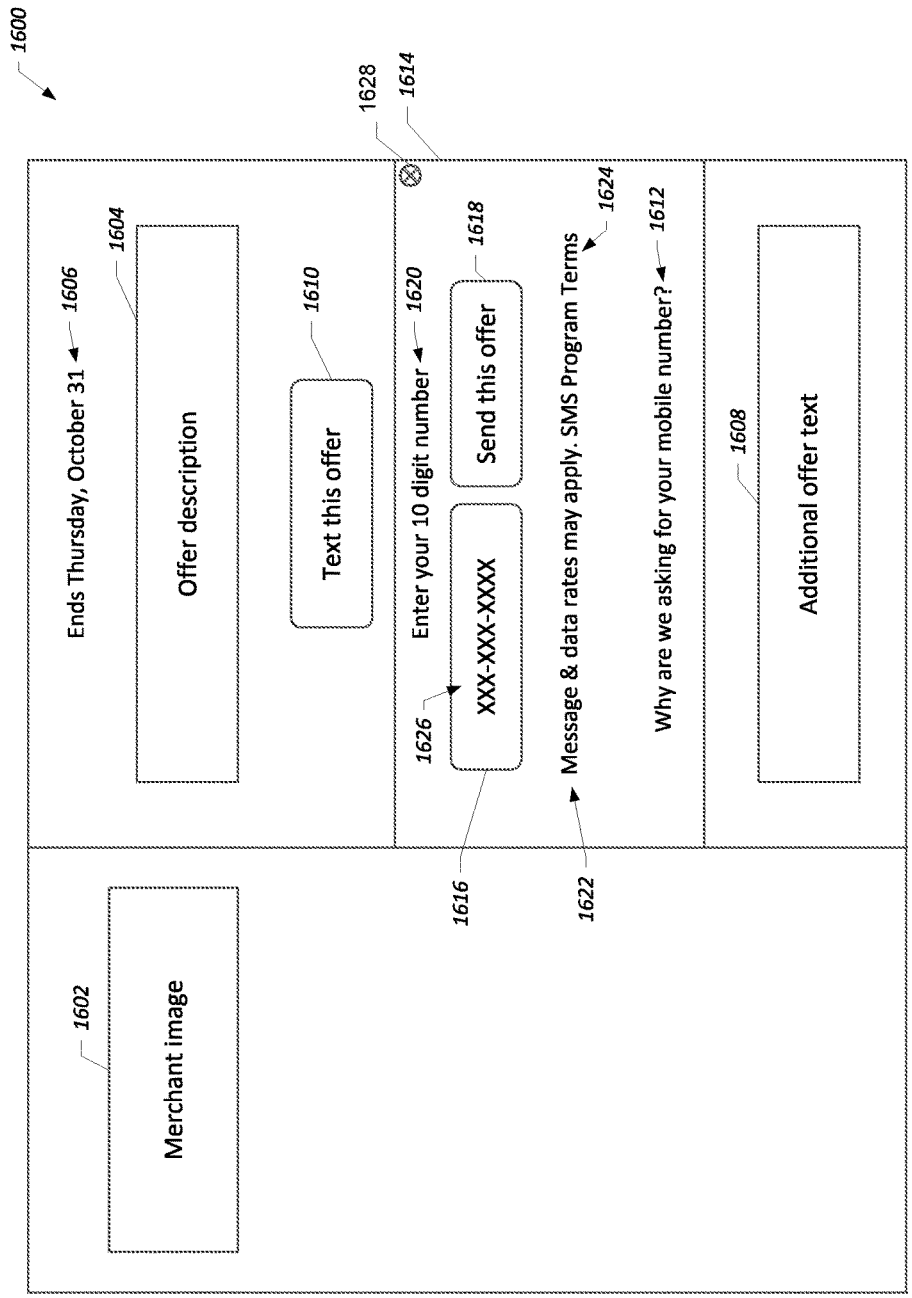

As described above, the offer presentation configuration process 80 and content negotiation module 30 offer content based on various parameters. In some embodiments, as described above, the offer content for a single-use offer may include a user interface for obtaining a single-use offer code via text message. FIGS. 16A and 16B show an example of offer content 1600 having a user interface for obtaining a single-use offer code via text message. The offer content 1600 may be representative of offer content displayed on a small display screen, DOM element, or window, or analogous offer content may be configured for display on a relatively large screen display screen, DOM element, or window. For example, in some embodiments, the offer content 1600 may be displayed within a native application executing on a smartphone, tablet computer, or other consumer user device. In other embodiments, the offer content 1600 may be displayed on a web browser or other application executing on a desktop computer, laptop computer, and the like. It should be appreciated that these embodiments are not exclusive and, for example, offer content 1600 may be displayed in any web browser or other suitable application executed by any suitable consumer user device 20.

The example of offer content 1600 illustrated in FIGS. 16A and 16B includes a merchant image 1602 (e.g., a merchant logo image and merchant banner associated with the offer or the merchant). The illustrated offer content 1600 also includes a various resources and content specific to the offer, such as a description of the offer 1604, a summary of the terms of the offer 1606, and a more comprehensive description of the terms of the offer 1608 (or, in some embodiments, a link to the comprehensive description of the terms of the offer). Additionally, the offer content 1600 includes a user-selectable interface, e.g., button 1610, for requesting a text message at a phone number for the single-use offer code, and a link to a usage policy for the request 1612. The offer content 1600 may include scripts, such as JavaScript™, that execute upon a user selecting the button 1610 (e.g., in response to an on-click event or an on-touch event), and those scripts may initiate the above-described steps of process 1300 that implement the requested functionality. Upon selection of the link 1612, the offer content 1600 may show a comprehensive description of the usage policy for any data (e.g., a phone number) submitted via the offer content 1600. For example, the usage policy may describe how the phone number will be used to obtain a single-use offer code and the restrictions on the obtained code.

Upon selection of the button 1610, the user may be prompted to enter a phone number to receive a single-use offer code of the offer. FIG. 16B depicts an example of the offer content 1600 after user selection of the button 1610. As shown in FIG. 16B, the offer content 1600 may include a section 1614 for entering a phone number to receive a text message having a single-use offer code. The section 1614 may include an input field 1616 (e.g., a text field), a user-selectable interface, e.g., "Send this offer" button 1618, instructional text 1620, and a terms and disclaimer summary 1622, a link to a comprehensive description of the terms and disclaimer 1624, and another user-selectable interface, e.g., close button 1628, for closing the section 1614

After selecting the "Text this offer" button 1610, the section 1614 may be displayed and the user may enter a phone number 1626 in the input field 1616. In some embodiments, the offer content may include scripts, such as JavaScript™, that check the format, validity, or both of the input entered into the input field 1616, such as upon entry of the input or after selection of the "Send this offer" button 1618. For example, if the user enters an invalid phone number, a notification may be displayed to the user indicating that input was invalid.

To send the request for the single-use offer code, the user may select the "Send this offer" button 1618. As noted above, the offer content 1600 may include scripts, such as JavaScript.™., that execute upon a user selecting the button 1618 (e.g., in response to an on-click event or an on-touch event), and those scripts may initiate the above-described steps of process 1300 that implement the requested functionality. For example, after selecting the button 1618, the phone number entered in the input field 1616 may be sent to the affiliate-network system 12 and processed in the manner described above. A user may close the section 1614 by selecting the close button 1628 and the offer content 1600 illustrated in FIG. 16A may be displayed.

After selection of the "Send this offer" button 1618 and sending of the request, confirmation content may be displayed to the user. For example, a confirmation message (e.g., "A text message with a link to your code is on its way" may be provided in the confirmation content displayed on the consumer user device 20. The confirmation content may also include links (e.g., URIs) to other offers. After sending the request, a user may receive a link to the single-use offer code, as described above in process 1300 and illustrated in FIG. 13B.

It should be appreciated similar offer content to that depicted in FIGS. 16A and 16B may also be provided for embodiments using a device identifier for the distribution and use of single-use offer codes. For example, such offer content may include a user interface for requesting a single-use offer code. In such embodiments, the user may not enter any input, as the device identifier may be provided from the consumer user device 20 without additional selections by the user (if the user has authorized sharing of the device identifier). In such embodiments, the user offer content may subsequently provide a link to the single-use offer code associated with the device identifier, as described above in FIG. 14.

Figure 17:
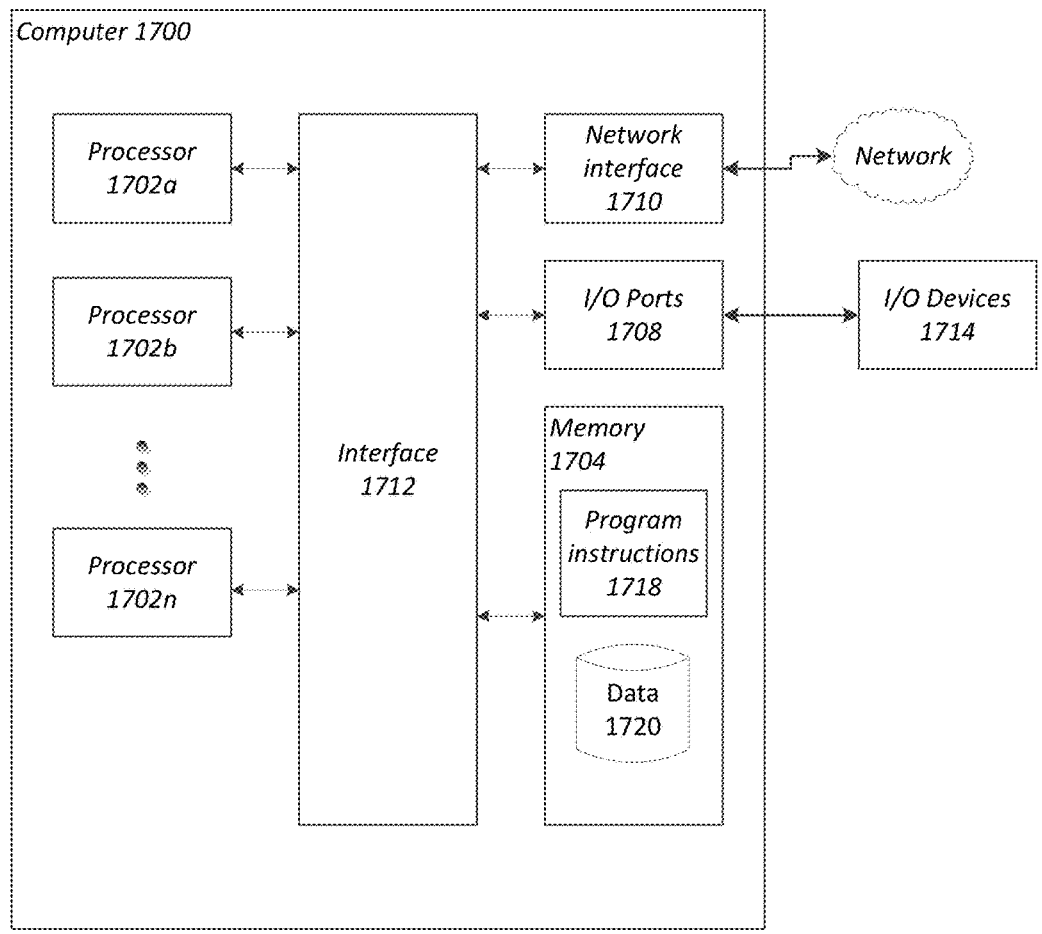
FIG. 17 shows an example of a computing system by which the above-mentioned systems, devices, and processes may be implemented.

FIG. 17 is a diagram that illustrates an exemplary computing system 1700 in accordance with embodiments of the present technique. Various portions of systems and methods described herein, may include or be executed on one or more computer systems similar to computing system 1700. Further, processes and modules described herein may be executed by one or more processing systems similar to that of computing system 1700.

Computing system 1700 may include one or more processors (e.g., processors 1702a-1702n) coupled to system memory 1704, an input/output I/O device interface 1708, and a network interface 1710 via an input/output (I/O) interface 1712. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1704). Computing system 1700 may be a uni-processor system including one processor (e.g., processor 1702*a*), or a multi-processor system including any number of suitable processors (e.g., 1702*a*-1702*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1700 may include a plurality of computing devices (e.g., distributed computer systems) to implement various processing functions.

I/O device interface 1708 may provide an interface for connection of one or more I/O devices 1714 to computer system 1700. I/O devices may include devices that receive input (e.g., from a user) or output information (e.g., to a user). I/O devices 1714 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1714 may be connected to computer system 1700 through a wired or wireless connection. I/O devices 1714 may be connected to computer system 1700 from a remote location. I/O devices 1714 located on remote computer system, for example, may be connected to computer system 1700 via a network and network interface 1710.

Network interface 1710 may include a network adapter that provides for connection of computer system 1700 to a network. Network interface may 1710 may facilitate data exchange between computer system 1700 and other devices connected to the network. Network interface 1710 may support wired or wireless communication. The network may include an electronic communication network, such as the Internet, a local area network (LAN), a wide area network (WAN), a cellular communications network, or the like.

System memory 1704 may be configured to store program instructions 1718 or data 1720. Program instructions 1718 may be executable by a processor (e.g., one or more of processors 1702*a*-1702*n*) to implement one or more embodiments of the present techniques. Instructions 1718 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1704 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1704 may include a non-transitory computer readable storage medium that may have program instructions stored thereon that are executable by a computer processor (e.g., one or more of processors 1702*a*-1702*n*) to cause the subject matter and the functional operations described herein. A memory (e.g., system memory 1704) may include a single memory device and/or a plurality of memory devices (e.g., distributed memory devices).

I/O interface 1712 may be configured to coordinate I/O traffic between processors 1702*a*-1702*n*, system memory 1704, network interface 1710, I/O devices 1714, and/or other peripheral devices. I/O interface 1712 may perform protocol, timing, or other data transformations to convert data signals from one component (e.g., system memory 1704) into a format suitable for use by another component (e.g., processors 1702*a*-1702*n*). I/O interface 1712 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1700 or multiple computer systems 1700 configured to host different portions or instances of embodiments. Multiple computer systems 1700 may provide for parallel or sequential processing/execution of one or more portions of the techniques described herein.

Those skilled in the art will appreciate that computer system 1700 is merely illustrative and is not intended to limit the scope of the techniques described herein. Computer system 1700 may include any combination of devices or software that may perform or otherwise provide for the performance of the techniques described herein. For example, computer system 1700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1700 may be transmitted to computer system 1700 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood when considered in view of the following enumerated embodiments:

1. An affiliate-network system configured to act as an intermediary between merchants issuing coupons or other offers and publishers promoting the offers to consumers, the affiliate-network system being configured to distribute and track usage of both on-line offers and in-store offers, the system comprising: one or more processors: non-transitory tangible computer-readable memory storing instructions that when executed by one or more of the one or more processors effectuate operations comprising: obtaining an offer issued by a merchant, the offer being redeemable both on-line, at the merchant's website, in-store, at a physical location of the merchant, or a combination thereof; obtaining a plurality of single-use offer codes associated with the offer, each of the plurality of single-use offer codes being redeemable for a single transaction; receiving, via a network, a request for a single-use offer code, the request comprising a phone number; sending to the phone number, via a text messaging service, a text message comprising a uniform resource identifier (URI) to a select single-use offer code of the plurality single-use offer codes; and sending the select single-use offer code to a consumer user device in response to a user selection of the URI on the consumer user device.

2. The affiliate-network system of embodiment 1, the memory storing instructions that when executed by one or more of the one or more processors effectuate operations comprising: receiving indications from the consumer user device that a consumer selected an in-store redemption option; sending the consumer in-store redemption data documenting that the consumer is in possession of the offer for presentation to the merchant at a physical location of the merchant, the data identifying a publisher that presented the offer to the consumer to credit the publisher; receiving transaction data from the merchant indicating that the consumer redeemed the offer, the transaction data including the select single-use offer code; and determining compensation for the publisher based on the transaction data.

3. The affiliate-network system of any of embodiments 1-2, the memory storing instructions that when executed by one or more of the one or more processors effectuate operations comprising: identifying the select single-use offer code as invalid after receiving the transaction data.

4. The affiliate-network system of any of embodiments 1-3, the memory storing instructions that when executed by one or more of the one or more processors effectuate operations comprising: receiving indications from the consumer user device that the consumer selected an on-line redemption option; storing online redemption data in memory documenting that the consumer selected the offer and identifying a publisher that presented the offer to the consumer to credit the publisher; instructing the consumer user device to request content from the merchant's website; obtaining the online redemption data stored in memory upon the consumer redeeming the offer, the online redemption data including the select single-use offer code; and determining compensation for the publisher based on the obtained online redemption data.

5. The affiliate-network system of embodiment 4, the memory storing instructions that when executed by one or more of the one or more processors effectuate operations comprising: identifying the select single-use offer code as invalid after receiving the online redemption data.

6. The affiliate-network system of any of embodiments 1-5, the memory storing instructions that when executed by one or more of the one or more processors effectuate operations comprising: storing the plurality of single-use offer codes in an offer data store.

7. The affiliate-network system of any of embodiments 1-6, wherein sending the select single-use offer code to the consumer user device in response to a user selection of the URI comprises sending single-use offer code content that includes the select single-use offer code.

8. The affiliate-network system of any of embodiments 1-7, the memory storing instructions that when executed by one or more of the one or more processors effectuate operations comprising: determining whether phone number is associated with any of the plurality of single-use offer codes.

9. The affiliate-network system of any of embodiments 1-8, wherein the text messaging service comprises the Short Messaging Service (SMS).

10. A method, comprising: receiving at an affiliate-network system, a request for a single-use offer code of a single-use offer, the request comprising a phone number, the affiliate-network system comprising one or more processors; sending to the phone number, via a text messaging service, a text message comprising a uniform resource identifier (URI) to a select single-use offer code of a plurality single-use offer codes; receiving at the affiliate-network system a user selection of the URI from a consumer user device; and sending single-use offer code content having the select single-use offer code to the consumer device in response to the user selection of the URI.

11. The method of embodiment 10, comprising obtaining offline transaction data from a merchant system, the offline transaction data including a transaction having redemption of the select single-use offer code.

12. The method of embodiment 11, comprising identifying the select single-use offer code as invalid based on the redemption.

13. The method of any of embodiments 10-12, comprising obtaining online redemption data from a merchant system, the online redemption data including redemption of the select single-use offer code.

14. The method of embodiment 13, comprising identifying the select single-use offer code as invalid based on the redemption.

15. The method of any of embodiments 10-14, comprising determining whether the phone number is associated with any of the plurality of single-use offer codes.

16. The method of embodiment 15, comprising associating the select single-use offer code with the phone number if none of the plurality of single-use offer codes are associated with the phone number.

17. The method of any of embodiments 10-16, wherein the text messaging service comprises the short messaging service (SMS).

18. An affiliate-network system configured to act as an intermediary between merchants issuing coupons or other offers and publishers promoting the offers to consumers, the affiliate-network system being configured to distribute and track usage of both on-line offers and in-store offers, the system comprising: one or more processors; and non-transitory tangible computer-readable memory storing instructions that when executed by one or more of the one or more processors effectuate operations comprising: obtaining an offer issued by a merchant, the offer being redeemable both on-line, at the merchant's website, in-store, at a physical location of the merchant, or a combination thereof; obtaining a plurality of single-use offer codes associated with the offer, each of the plurality of single-use offer codes being redeemable for a single transaction; receiving from a consumer user device, via a network, a request for a single-use offer code, the request comprising a device identifier that uniquely identifiers the consumer user device; sending to the consumer user device, via the network, a uniform resource identifier (URI) to a select single-use offer code of the plurality single-use offer codes; and sending to the consumer user device, over the network, the select single-use offer code in response to a user selection of the URI.

19. The affiliate-network system of embodiment 18, the memory storing instructions that when executed by one or more of the one or more processors effectuate operations comprising: receiving indications from the consumer user device that a consumer selected an in-store redemption option; sending the consumer in-store redemption data documenting that the consumer is in possession of the offer for presentation to the merchant at a physical location of the merchant, the data identifying a publisher that presented the offer to the consumer to credit the publisher; receiving transaction data from the merchant indicating that the consumer redeemed the offer, the transaction data including the select single-use offer code; and; determining compensation for the publisher based on the transaction data.

20. The affiliate-network system of embodiment 19, the memory storing instructions that when executed by one or more of the one or more processors effectuate operations comprising: identifying the select one of the plurality of single-use offer codes as invalid after receiving the transaction data.

21. The affiliate-network system of any of embodiments 18-20, the memory storing instructions that when executed by one or more of the one or more processors effectuate operations comprising: receiving indications from the consumer user device that a consumer selected an on-line redemption option; storing on-line redemption data in memory documenting that the consumer selected the offer and identifying a publisher that presented the offer to the consumer to credit the publisher; instructing the consumer user device to request content from the merchant's website; obtaining the online redemption data stored in memory upon the consumer redeeming the offer, the online redemption including the select single-use offer code; and determining compensation for the publisher based on the obtained online redemption data.

22. The affiliate-network system of embodiment 21, the memory storing instructions that when executed by one or more of the one or more processors effectuate operations comprising: identifying the select one of the plurality of single-use offer codes as invalid after receiving the online redemption data.

23. The affiliate-network system of any of embodiments 18-22, wherein sending the select single-use offer code to the consumer user device in response to a user selection of the URI comprises sending single-use offer code content that includes the select single-use offer code.

24. The affiliate-network system of any of embodiments 18-23, the memory storing instructions that when executed by one or more of the one or more processors effectuate operations comprising: determining whether the device identifier is previously associated with any of the plurality of single-use offer codes.

25. The affiliate-network system of any of embodiments 18-25, wherein the text messaging service comprises the Short Messaging Service (SMS).

26. A method, comprising: receiving at an affiliate-network system, via a network, a request for a single-use offer code of a single-use offer from a consumer user device, the request comprising a device identifier that uniquely identifies the consumer user device, the affiliate-network system comprising one or more processors; sending to the consumer user device identified by the device identifier, via the network, a uniform resource identifier (URI) to a select single-use offer code of a plurality single-use offer codes; receiving from the consumer user device a user selection of the URI; and sending to the consumer user device single-use offer code content having the select single-use offer code to the consumer device in response to the user selection of the URI.

27. The method of embodiment 26, comprising determining whether the device identifier is associated with any of the plurality of single-use offer codes.

28. The method of embodiment 27, comprising associating the select single-use offer code with the device identifier if none of the plurality of single-use offer codes are associated with the device identifier.

29. The method of any of embodiments 26-28, wherein the text messaging service comprises the short messaging service (SMS).

30. The method of any of embodiments 26-30, wherein the device identifier comprises a Unique Device Identifier (UDID).

What is claimed is:

1. A method, having the ability to provide single-use offers redeemable in store or online, comprising:
    receiving at an affiliate-network system comprising one or more processors, a first request for a single-use offer code of a single-use offer, the request comprising indications of an intent to redeem the single-use offer in store or on-line and information of a first requestor;
    analyzing the first request, such analysis comprising one or more of:
        comparing the information of the first requestor against information representative of at least the existence of previous other requests by the first requestor; or
        comparing the information of the first requestor with a potential redemption location of the single-use offer;
    in response to determining that the indications are of an intent of the first requestor to redeem in store:
        sending to a consumer device at a phone number, via a text messaging service, a text message comprising a uniform resource identifier (URI) to a first single-use offer code of a plurality single-use offer codes;
        receiving at the affiliate-network system a user selection of the URI from the consumer user device of the first requestor; and
        sending single-use offer code content having the first single-use offer code to the consumer device of the first requestor in response to the user selection of the URI;
    receiving at the affiliate-network system, a second request for a single-use offer code of the single-use offer, the second request comprising indications of an intent to redeem the single-use offer in store or on-line and information of a second requestor; and
    in response to determining that the indications are of an intent of the second requestor to redeem online:
        storing online redemption data in memory documenting that the single user offer was requested and identifying a publisher that presented the offer to the consumer to credit the publisher;
        sending to a consumer user device of the second requestor instructions to request content from a merchant's website;
        obtaining the online redemption data stored in memory upon the second requestor redeeming the offer, the online redemption data including a second single-use offer code different from the first single-use offer code; and
        determining compensation for the publisher based on the obtained online redemption data.

2. The method of claim 1, comprising obtaining offline transaction data from a merchant system, the offline transaction data including a transaction having redemption of the first single-use offer code.

3. The method of claim 2, comprising identifying the single-use offer code as invalid based on the redemption.

4. The method of claim 1, comprising obtaining online redemption data from a merchant system, the online redemption data including redemption of the second single-use offer code.

5. The method of claim 4, comprising identifying the second single-use offer code as invalid based on the redemption.

6. The method of claim 1, comprising determining whether the phone number is associated with any of a plurality of single-use offer codes.

7. The method of claim 6, comprising associating the second single-use offer code with the phone number in response to determining that none of the plurality of single-use offer codes are associated with the phone number.

8. The method of claim 1, wherein the text messaging service comprises the short messaging service (SMS).

9. An affiliate-network system configured to act as an intermediary between merchants issuing coupons or other offers and publishers promoting the offers to consumers, the affiliate-network system being configured to distribute and track usage of both on-line offers and in-store offers, the system comprising:
    one or more processors;
    non-transitory tangible computer-readable memory storing instructions that when executed by one or more of the one or more processors effectuate operations comprising:
        obtaining an offer issued by a merchant, the offer being redeemable both on-line, at the merchant's website, in-store, at a physical location of the merchant, or a combination thereof;

obtaining a plurality of single-use offer codes associated with the offer, each of the plurality of single-use offer codes being redeemable for a single transaction;

receiving from a consumer user device, via a network, a request for a single-use offer code usable either on-line, at the merchant's website or in-store, at a physical location of the merchant, the request comprising a device identifier that uniquely identifies the consumer user device;

analyzing the request, such analysis comprising one or more of:
  comparing the request against information representative of at least the existence of previous other requests related to the consumer user device; or
  receiving information related to a physical location of the request and comparing the physical location of the address with a potential redemption location of the offer;

if the request is for a single-use offer code usable in-store, at a physical location of the merchant,
  sending to the consumer user device, via the network, a uniform resource identifier (URI) to obtain a select single-use offer code of the plurality single-use offer codes; and
  sending to the consumer user device, over the network, the select single-use offer code in response to a user selection of the URI; and if the request is for a single-use offer code usable on-line, at the merchant's website,
  storing online redemption data in memory documenting that the consumer selected the offer and identifying a publisher that presented the offer to the consumer to credit the publisher;
  instructing the consumer user device to request content from the merchant's website;
  obtaining the online redemption data stored in memory upon the consumer redeeming the offer, the online redemption data including the select single-use offer code; and
  determining compensation for the publisher based on the obtained online redemption data.

10. The affiliate-network system of claim 9, the memory storing instructions that when executed by one or more of the one or more processors effectuate operations comprising:
  receiving indications from the consumer user device that a consumer selected an in-store redemption option;
  sending the consumer in-store redemption data documenting that the consumer is in possession of the offer for presentation to the merchant at a physical location of the merchant, the data identifying a publisher that presented the offer to the consumer to credit the publisher;
  receiving transaction data from the merchant indicating that the consumer redeemed the offer, the transaction data including the select single-use offer code; and
  determining compensation for the publisher based on the transaction data.

11. The affiliate-network system of claim 10, the memory storing instructions that when executed by one or more of the one or more processors effectuate operations comprising:
  identifying the select one of the plurality of single-use offer codes as invalid after receiving the transaction data.

12. The affiliate-network system of claim 9, the memory storing instructions that when executed by one or more of the one or more processors effectuate operations comprising:
  receiving indications from the consumer user device that a consumer selected an on-line redemption option;
  storing on-line redemption data in memory documenting that the consumer selected the offer and identifying a publisher that presented the offer to the consumer to credit the publisher;
  instructing the consumer user device to request content from the merchant's website;
  obtaining the online redemption data stored in memory upon the consumer redeeming the offer, the online redemption including the select single-use offer code; and
  determining compensation for the publisher based on the obtained online redemption data; and
  identifying the select one of the plurality of single-use offer codes as invalid after receiving the online redemption data.

13. The affiliate-network system of claim 9, wherein sending the select single-use offer code to the consumer user device in response to a user selection of the URI comprises sending single-use offer code content that includes the select single-use offer code.

14. The affiliate-network system of claim 9, the memory storing instructions that when executed by one or more of the one or more processors effectuate operations comprising:
  determining whether the device identifier is previously associated with any of the plurality of single-use offer codes.

15. A method, comprising:
  receiving at an affiliate-network system, via a network, a first request for a single-use offer code of a single-use offer from a first consumer user device, the first request comprising a first device identifier that uniquely identifies the first consumer user device, the affiliate-network system comprising one or more processors;
  in response to determining that the single use offer is to be redeemed in-store, at a physical location of a merchant:
    sending to the first consumer user device identified by the first device identifier, via the network, a uniform resource identifier (URI) to a first single-use offer code of a plurality single-use offer codes;
    receiving from the consumer user device a user selection of the URI; and
    sending to the consumer user device the first single-use offer code content having the first single-use offer code to the first consumer device in response to the user selection of the URI;
  receiving at the affiliate-network system, via the network, a second request for a single-use offer code of the single-use offer from a second consumer user device, the second request comprising a second device identifier that uniquely identifies the second consumer user device; and
  in response to determining that the single use offer is to be redeemed on-line, at a merchant's website,
    storing online redemption data in memory documenting that the second consumer device selected the offer and identifying a publisher that presented the offer to the second consumer device to credit the publisher;
    instructing the second consumer user device to request content from the merchant's website;
    obtaining the online redemption data stored in memory upon the second consumer redeeming the offer, the online redemption data including the second single-use offer code; and determining compensation for the publisher based on the obtained online redemption data.

16. The method of claim 15, comprising determining whether the first device identifier is associated with any of the plurality of single-use offer codes.

17. The method of claim 16, comprising associating the first single-use offer code with the first device identifier in response to determining that none of the plurality of single-use offer codes are associated with the device identifier.

* * * * *